(12) United States Patent
Sun et al.

(10) Patent No.: US 11,335,900 B2
(45) Date of Patent: May 17, 2022

(54) NANOSHEET COMPOSITE FOR CATHODE OF LITHIUM-SULFUR BATTERY, PREPARATION METHOD THEREOF AND ELECTRODE AND BATTERY COMPRISING THE SAME

(71) Applicant: ZHEJIANG A & F UNIVERSITY, Hangzhou (CN)

(72) Inventors: Qingfeng Sun, Hangzhou (CN); Hanwei Wang, Hangzhou (CN); Chunde Jin, Hangzhou (CN)

(73) Assignee: ZHEJIANG A & F UNIVERSITY, Hangzhou (CN)

( * ) Notice: Subject to any disclaimer, the term of this patent is extended or adjusted under 35 U.S.C. 154(b) by 190 days.

(21) Appl. No.: 16/215,997

(22) Filed: Dec. 11, 2018

(65) Prior Publication Data
US 2020/0152965 A1 May 14, 2020

Related U.S. Application Data

(60) Provisional application No. 62/759,928, filed on Nov. 12, 2018.

(51) Int. Cl.
*H01M 4/13* (2010.01)
*H01M 4/136* (2010.01)
(Continued)

(52) U.S. Cl.
CPC .......... *H01M 4/136* (2013.01); *H01M 4/133* (2013.01); *H01M 4/663* (2013.01); *H01M 10/0525* (2013.01); *H01M 2004/027* (2013.01)

(58) Field of Classification Search
None
See application file for complete search history.

(56) References Cited

U.S. PATENT DOCUMENTS

2016/0294000 A1* 10/2016 He .................... H01M 10/054

FOREIGN PATENT DOCUMENTS

| CN | 102903907 A | * | 1/2013 | ............ H01M 4/505 |
| CN | 105047882 A | * | 11/2015 | ............ H01M 4/139 |

(Continued)

OTHER PUBLICATIONS

Pan et al., "Non-encapsulation approach for high-performance Li—S batteries through controlled nucleation and growth," Nature Engergy, Oct. 2017, pp. 813-820, vol. 2, Macmillan Publishers Limited.

(Continued)

*Primary Examiner* — Ula C Ruddock
*Assistant Examiner* — Tony S Chuo

(57) ABSTRACT

A composite nanosheet for the cathode of a lithium-sulfur battery, a preparation method thereof, and an electrode and a battery having the same. The composite nanosheet includes carbon nanotubes which are closely accumulated in a two-dimensional plane and are combined together by carbon derived from nanocellulose. Transition metal compound nanoparticles which are uniformly distributed in the nanosheet composite and are fixed by the carbon derived from nanocellulose. Sulfur adsorbed on the surface of the transition metal compound nanoparticles. The composite organically combines and exerts the respective advantages of porous carbon, carbon nanotubes and nano metal oxides/sulfide by designing and constructing the structure of the cathode material.

8 Claims, 14 Drawing Sheets

(51) Int. Cl.
    *H01M 4/133*     (2010.01)
    *H01M 10/0525*     (2010.01)
    *H01M 4/66*     (2006.01)
    *H01M 4/02*     (2006.01)

(56) References Cited

FOREIGN PATENT DOCUMENTS

| | | | | | |
|---|---|---|---|---|---|
| CN | 105047889 | A | * | 11/2015 | .......... H01M 10/052 |
| CN | 105428616 | A | * | 3/2016 | ........ H01M 10/0525 |
| CN | 106058150 | A | * | 10/2016 | .............. H01M 4/13 |
| CN | 108091874 | A | * | 5/2018 | ............. B82Y 30/00 |

OTHER PUBLICATIONS

Chen, et al., Nanocellulose: A Promising Nanomaterial for Advanced Electrochemical Energy Storage, Chemical Society Reviews, Mar. 21, 2018, pp. 2837-2872, vol., Issue 8, Royal Society of Chemistry, England, UK.

Yang, et al., Determination of Cellulose Crystallinity of Bamboo Culms with X-ray Diffraction Spectrum, Journal of Northeast Forestry University, Aug. 2010, pp. 75-77, vol. 38, Issue 8, Northeast Forestry University, Harbin, China.

Lu, Preliminary Studies on the Variability of Relative Crystallinity in the Wood Cellulose of Larix gmelinii Rupr. Before and After Drying, China Wood Industry, Oct. 1988, pp. 3-7, vol. 2, Issue 4, Chinese Academy of Forestry, Beijing, China.

* cited by examiner

NANOSHEET COMPOSITE FOR CATHODE OF LITHIUM-SULFUR BATTERY, PREPARATION METHOD THEREOF AND ELECTRODE AND BATTERY COMPRISING THE SAME

RELATED APPLICATION

The present application claims the benefit of the U.S. provisional patent application 62/759,928 filed Nov. 12, 2018, which is incorporated herein by reference in its entirety.

FIELD OF THE INVENTION

The invention belongs to the technical field of preparation of electrode material, and particularly relates to a nanosheet composite for the cathode of a lithium-sulfur battery, a preparation method thereof and a electrode and a battery comprising the same.

BACKGROUND OF THE INVENTION

A lithium-sulfur battery is a lithium battery with the sulfur element as the cathode of the battery. On the earth, the elemental sulfur is abundant, and is characterized by low price, environmental friendliness, stable property and low toxicity. The lithium-sulfur battery with sulfur as the cathode material and lithium metal as the anode material has a theoretical specific energy of 2600 Wh/kg. Currently, the lithium-sulfur battery has the highest theoretical specific energy almost in all secondary batteries except for the air battery. Moreover, when sulfur of the cathode completely reacts to generate $Li_2S$ ($S+2Li=Li_2S$), the corresponding theoretical specific capacity can reach 1675 mAh/g, which is much higher than the theoretical specific capacity of the commercially available lithium cobalt oxide battery (<150 mAh/). More importantly, the reaction between sulfur and lithium is reversible, and such property provides the basis for the development of the electrode material for secondary batteries.

However, a lithium-sulfur battery with the cathode comprising 100% sulfur cannot be used, because elemental sulfur has both very low electronic conductivity and very low ion conductivity, which results in its low electrochemical performance. Moreover, sulfur can produce a volume change of up to 22% during charge and discharge, causing structural cracking accompanied by the formation of a large amount of lithium polysulfide dissolved in the electrolyte. Based on the shuttle principle, the dissolved lithium polysulfide will pass through the separator to deposit on the metal lithium, causing corrosion of metal lithium, increase of internal resistance of the battery, and loss of cathode sulfur, thereby resulting in decrease in battery cycling stability and gradual attenuation of capacity. The modification on the cathode of lithium-sulfur battery can effectively improve the conductivity of the sulfur cathode and inhibit the dissolution of lithium polysulfide.

At present, the modification on a sulfur cathode is mainly achieved by compounding sulfur with a conductive material or a nano metal oxide/sulfide. The conductive material is mostly a non-polar carbonaceous material such as porous carbon, graphite, graphene, carbon nanotube and the like. Porous carbon has the characteristics of high pore volume and high specific surface area, and by filling elemental sulfur into its pores, it helps to load a large amount of elemental sulfur and prepare into a composite cathode material having a high mass loading of sulfur. Moreover, because of rich porosity, sulfur is divided into sulfur nanoparticles having both small particle size and small size, which can effectively enhance the diffusion rate of electrons and ions in sulfur, thereby improving the utilization rate of elemental sulfur. The strong adsorption effect of the surface of porous carbon can effectively inhibit the dissolution of lithium polysulfide, reduce self-discharge and inhibit the generation of the shuttle effect, and avoid the deposition of non-conductive product (such as sulfur) on the surface of porous carbon, thereby reducing the occurrence of polarization effect, improving the long-term cycling stability of the battery. However, due to the fact that a large amount of amorphous carbon exists in porous carbon, the conductivity of porous carbon is much weaker than highly graphitized carbon black, carbon nanotube, graphite, graphene and the like.

Carbon nanotube is an excellent electron conductor, and has an excellent specific surface area and a pore structure. Compared with graphene, low-cost carbon nanotubes have a higher ionic conductivity, and the unique linear structure of carbon nanotubes makes them exhibit a higher structural designability, thereby attracting widespread attention in the field of lithium-sulfur battery. Pan et al., in Nature Energy 2, 813-820 (2017), grows sulfur on carbon nanotube electrodes by an electrochemical growth method. Although 100% utilization of sulfur is realized for the first time and the efficient availability of carbon nanotubes is proven, the loading mass of sulfur is only 1-2 mg. Therefore, the problem of utilization rate of sulfur under a high mass loading on the carbon nanotube electrode has not been effectively solved.

The compounding of nano metal oxide/sulfide with sulfur is also an effective method for cathode modification. Not only can the nano metal oxide/sulfide itself provide an effective capacitance value, but also the polar surface thereof helps to closely adsorb the polar lithium polysulfide and reduce the loss of lithium polysulfide, thereby achieving the effect of improving cycling stability. However, the low conductivity and the large volumetric change rate of the nano metal oxide/sulfide itself during charge and discharge limit the use of the composite formed by compounding it alone with sulfur in sulfur-lithium batteries.

OBJECTS AND SUMMARY OF THE INVENTION

In view of the difficulty in preparing a cathode material for a lithium-sulfur battery simultaneously having high mass load and utilization of sulfur, high cycling stability, high rate performance and high capacity, the object of the present invention is to, by designing and constructing the structure of a cathode material, find a composite that organically combines and exerts the respective advantages of porous carbon, carbon nanotubes, and nano metal oxides/sulfides, and a preparation method and application thereof.

The present invention provides a nanosheet composite for the cathode of a lithium-sulfur battery, the nanosheet composite comprising:

carbon nanotubes which are closely accumulated in a two-dimensional plane and are combined together by carbon derived from nanocellulose;

transition metal compound nanoparticles which are uniformly distributed in the nanosheet composite and are fixed by the carbon derived from nanocellulose; and sulfur adsorbed on the surface of the transition metal compound nanoparticles.

In the present invention, unless otherwise stated, the term "sulfur" refers to elemental sulfur.

The nanosheet composite provided according to the present invention, wherein the carbon nanotubes may be carbon nanotubes pretreated by a conventional method, for example, carbon nanotubes pretreated by nitric acid.

The nanosheet composite provided according to the present invention, wherein the amount of the carbon nanotubes is from 2 wt % to 24 wt %, the amount of the nanocellulose-derived carbon is from 2 wt % to 24 wt %, the amount of the transition metal compound nanoparticles is from 16 wt % to 48 wt %, and the amount of the sulfur is from 40 wt % to 80 wt %, based on the weight of the nanosheet composite.

The nanosheet composite provided according to the present invention, wherein the transition metal compound comprises one or more of transition metal oxide, transition metal sulfide, and transition metal phosphide. The transition metal comprises one or more of a series of metal elements of d-block in the periodic table of elements. Preferably, the transition metal may be one or more of Ti, Mn, Fe, Co, Ni, Cr, Cu, Zn, Zr, Nd, Mo, Pd, Ag and Cd.

The nanosheet composite provided according to the present invention, wherein the nanocellulose is one or more of bacterial cellulose, lignocellulose and cellulose extracted from bamboo.

According to another aspect of the present invention, the present invention also provides a preparation method for a nanosheet composite for the cathode of a lithium-sulfur battery, the preparation method comprising the steps of:

(1) adding 10-40 parts by weight of transition metal compound precursor into a nanocellulose solution comprising 8-15 parts by weight of a nanocellulose (CNF), performing sonication at 0-15° C. for 3-15 minutes, then adding 1-5 parts by weight of carbon nanotube (CNT), and performing sonication for additional 3-15 minutes to obtain a dispersion liquid;

(2) freezing the dispersion liquid obtained in step (1) for 12 to 24 hours, and then freeze-drying it for 48-64 hours to obtain a transition metal compound precursor/CNF/CNT nanosheet composite;

(3) placing the nanosheet composite obtained in step (2) in a high temperature furnace purged with a protective gas, and heating it at 700 to 1100° C. for 60-720 minutes to obtain a transition metal compound/C/CNT nanosheet composite; and (4) compounding 2 to 80 parts by weight of the nanosheet composite obtained in step (3) with 20 to 98 parts by weight of sulfur at 150 to 300° C. to obtain the nanosheet composite for the cathode of a lithium-sulfur battery.

The preparation method provided according to the present invention, wherein the transition metal compound precursor includes one or more of transition metal oxide, transition metal sulfide, transition metal phosphide and transition metal carbonate. The transition metal includes one or more of a series of metal elements of d-block in the periodic table of elements. Preferably, the transition metal may be one or more of Ti, Mn, Fe, Co, Ni, Cr, Cu, Zn, Zr, Nd, Mo, Pd, Ag and Cd.

In the present invention, the transition metal compound precursor may be the same as or different from the transition metal compound.

The preparation method provided according to the present invention, wherein the nanocellulose is one or more of bacterial cellulose, lignocellulose and cellulose extracted from bamboo. Preferably, the concentration of nanocellulose in the nanocellulose solution is from 10 to 5000 mg/l.

Preferably, the solvent of the nanocellulose solution may be one or more of water, ethylene glycol, propylene glycol, glycerol and pentaerythritol.

The preparation method provided according to the present invention, preferably, the sonication in step (1) is performed at a power of 100 to 900 W.

The preparation method provided according to the present invention, wherein step (2) may be carried out by: placing the dispersion liquid obtained in step (1) in a deep-cooling refrigerator at −60° C. to −5° C. or in liquid nitrogen (about −193° C.) for freezing for 12 to 24 hours, and then placing it in a freeze dryer for freeze drying at a temperature of −60° C. to −30° C. under a pressure of less than 1 Pa for 48 to 64 hours.

The preparation method provided according to the present invention, wherein the protective gas in step (3) may be one or more of argon gas, nitrogen gas and helium gas.

The preparation method provided according to the present invention, wherein in step (4), the method for compounding the nanosheet composite obtained in step (3) with sulfur may be one or more of sulphur fumigation method, blend heating method and electrochemical growth method.

According to yet another aspect of the present invention, the present invention also provides a cathode of a lithium-sulfur battery, and the cathode of a lithium-sulfur battery comprises a cathode current collector and cathode material loaded on the cathode current collector, wherein the cathode material comprises a conductive agent, a binder, and a nanosheet composite, the nanosheet composite comprising:

carbon nanotubes which are closely accumulated in a two-dimensional plane and are combined together by carbon derived from nanocellulose;

transition metal compound nanoparticles which are uniformly distributed in the nanosheet composite and are fixed by the carbon derived from nanocellulose; and sulfur adsorbed on the surface of the transition metal compound nanoparticles.

The cathode of a lithium-sulfur battery provided according to the present invention, wherein the binder may be one or more of polyethylene, polyvinylidene fluoride, lithium carboxymethylcellulose, polypropylene, vinylidene fluoride and styrene-butadiene latex.

The cathode of a lithium-sulfur battery provided according to the present invention, wherein the conductive agent may be one or more of acetylene black, carbon black, artificial graphite, natural graphite, graphene and carbon nanotubes.

According to still another aspect of the present invention, the present invention also provides a preparation method for a cathode of a lithium-sulfur battery, the preparation method comprising:

mixing 1 to 30 parts by weight of a conductive agent, 1 to 30 parts by weight of a binder, and 60 to 98 parts by weight of a nanosheet composite to prepare a cathode slurry; and coating the cathode slurry onto a cathode current collector to prepare an electrode, wherein the nanosheet composite comprises:

carbon nanotubes which are closely accumulated in a two-dimensional plane and are combined together by carbon derived from nanocellulose;

transition metal compound nanoparticles which are uniformly distributed in the nanosheet composite and are fixed by the carbon derived from nanocellulose; and sulfur adsorbed on the surface of the transition metal compound nanoparticles.

According to still another aspect of the present invention, the present invention also provides a lithium-sulfur battery comprising a cathode, a anode and an electrolyte, wherein the cathode includes a cathode current collector and a cathode material loaded on the cathode current collector, wherein the cathode material comprises a nanosheet composite, the nanosheet composite comprising:

carbon nanotubes which are closely accumulated in a two-dimensional plane and are combine together by carbon derived from nanocellulose;

transition metal compound nanoparticles which are uniformly distributed in the nanosheet composite and are also fixed by the carbon derived from nanocellulose; and sulfur adsorbed on the surface of the transition metal compound nanoparticles.

The nanosheet composite for the cathode of a lithium-sulfur battery provided by the invention has the following advantages:

(1) The nanosheet composite of the present invention has a unique structure, in which the CNTs are woven into a nanosheet structure by a simple preparation process, the cellulose-derived porous carbon fills and connects the voids between the CNTs, and the transition metal compound is inlaid in the porous carbon or CNTs (see FIG. 12);

(2) The unique structure of the nanosheet composite of the present invention successfully combines the advantages of carbon nanotubes, porous carbon and transition metal compounds, and the woven nanosheets exhibit a high conductivity (see Table 1);

(3) the nanosheet composite of the present invention exhibits a high mass loading of sulfur due to the large voids between the composite nanosheets and the existence of porous carbon and CNTs (see FIG. 8);

(4) the porous structure on the surface of the composite nanosheet provides an unblocked $Li^+$ transmission channel, and due to the weaving of the highly conductive CNTs, the present invention reduces the diffusion resistance of charge inside the porous carbon, provides a large-area and fast-conducting surface region, is beneficial to the deposition of lithium polysulfide, and reduces the change in the surface topography of the electrode due to local deposition of lithium polysulfide;

(5) The non-polarity of the porous carbon and CNTs and the polarity of the transition metal compound can effectively capture, adsorb and fix non-polar and polar electrochemical products, such as elemental sulfur and lithium polysulfide;

(6) due to the weaving of the highly conductive CNTs, the diffusion resistance of charge inside the porous carbon is reduced, and the diffusion impedance of charge inside the transition metal compound is also reduced, thereby improving the overall rate performance of the cathode material; and (7) after the electrode of the present invention is assembled into a sulfur-lithium battery, a high discharge specific capacitance, a high rate performance at a high current density and a stable cycle performance can be obtained. (See FIG. 12).

Among all nanocarbon materials, carbon nanotubes (CNTs) having a high conductivity, flexibility and unique one-dimensional structure are commonly used carbon skeleton materials of active nanomaterials, but they are difficult to efficiently load various active materials because of being limited by their low external surface area and insufficient binding sites. Moreover, poor contact caused by a chaotic disordered structure inhibits the exerting of the ultra-high conductivity of the carbon nanotubes themselves, so that the carbon nanotube powder only exhibits a conductivity of 300 to 500 $S·cm^{-1}$. At the same time, as the particle size of the loaded nanomaterials decreases, since the high activity and high specific surface area of the nanomaterial itself will cause a more serious agglomeration, eventually leading to a serious agglomeration (FIG. 15). When the nanomaterials are compounded with carbon nanotubes, these inherent defects will be particularly noticeable, and the nanomaterials often show a serious agglomeration (FIG. 17). The poor electric contact between the CNTs and the nanomaterials often leads to that the high conductivity of the CNTs and the high activity of the nanomaterials are difficult to exert. In order to achieve a good performance and maintain a high conductivity, current anodes of nanomaterials and CNTs mixture often use a low mass loading of active material, which is typically less than 50%. Low-density, high-content and low-activity carbon materials will seriously affect the properties of materials, and often lead to decrease of energy density and power density of an electrode, especially when serving as electrode materials.

Cellulose has the advantages of low cost, wide sources and having abundant polyhydroxy compounds, and has attracted wide attention. Among them, a myriad of hydroxyl groups on the surface of cellulose enable them to anchor the high-activity nanomaterials by binding to nanomaterials. Compared with chaotic disordered fibrous cellulose, cellulose having a 2D-nanonetwork structure exhibits a more abundant active site and a higher specific surface area, which can easily anchor and disperse active nanomaterials (FIG. 16 and FIG. 18). However, its poor conductivity results in that it is not suitable for use alone. Therefore, the present invention uses it as a template and disperses the nanomaterials and CNTs thereon, and obtains nanomaterial/C/CNT nanosheets (FIG. 19 and FIG. 20) by simple heat treatment, and such nanosheets have an extremely high conductivity, dispersibility and loading of nanomaterials, and only have a thickness of 50 nm (FIG. 21).

BRIEF DESCRIPTION OF FIGURES

Hereinafter, the embodiments of the present invention will be described in detail with reference to the accompanying drawings, in which.

DETAILED DESCRIPTION OF THE EMBODIMENTS

The present invention is further described in detail with reference to the specific embodiments thereof. The examples are given only to illustrate the present invention but not intended to limit the scope of the present invention.

Example 1

This Example is for illustrating the nanosheet composite (S/NiCo$_2$O$_4$/C/CNT) provided by the present invention and a preparation method thereof, and an electrode and a battery prepared with the material. The specific preparation steps are as follows:

(1) adding 0.1 g of NiCo$_2$O$_4$ nanomaterial into a nanocellulose aqueous solution containing 0.1 g of nanocellulose (with a nanocellulose concentration of 100 mg/l), performing sonication at a power of 400 W at a solution temperature of 0° C. for 5 minutes, then adding 0.02 g of CNTs (nitric acid-pretreated CNTs, the same below), and continuing sonication at a power of 400 W for 5 minutes to obtain a dispersion liquid;

(2) placing the dispersion liquid obtained in step (1) in a deep-cooling refrigerator and freezing it at −39° C. for 12 hours, and then placing it in a freeze dryer and freeze-drying it at −40° C. for 48 hours to obtain a NiCo$_2$O$_4$/NFC/CNT nanosheet composite;

(3) placing the nanosheet composite obtained in step (2) in a high-temperature furnace purged with nitrogen gas, setting the temperature to 1000° C., and heating for 120 minutes to obtain a NiCo$_2$O$_4$/C/CNT nanosheet composite; and (4) mixing 0.1 g of the nanosheet composite obtained in step (3) with 1 g of sulfur and heating the mixture at 155° C. for 360 minutes to obtain the S/NiCo$_2$O$_4$/C/CNT nanosheet composite with a very high mass loading of sulfur (about 85%).

Preparation of Electrode 70 parts by weight of the S/NiCo$_2$O$_4$/C/CNT nanosheet composite with a high mass loading of sulfur prepared in step (4) was mixed with 10 parts by weight of polyvinylidene fluoride and 20 parts by weight of acetylene black to prepare into an electrode slurry, and the electrode slurry was coated to prepare into an electrode with the mass of sulfur per unit area being 2.5 mg·cm$^{-2}$, 4.1 mg·cm$^{-2}$, 5.4 mg·cm$^{-2}$ and 7.7 mg·cm$^{-2}$ respectively.

Preparation of Battery

In a glove box with argon gas protection and a water content of 1 ppm or less, the electrode sheet prepared in this example was used as a cathode, a lithium metal sheet was used as an anode, bistrifluoromethane sulfonimide (LiTFSI) was dissolved in a mixed solution of 1,3-dioxolane (DOL) and ethylene glycol dimethyl ether (DME) (1:1 in volume) to prepare into a lithium ion electrolyte having a concentration of 1 M, and 2 wt % LiNO$_3$ was added, and polypropylene (PP) was used as a separator (Celgard 2325) to assemble into a CR2032 button battery.

Characterization and Analysis

Figure 15:
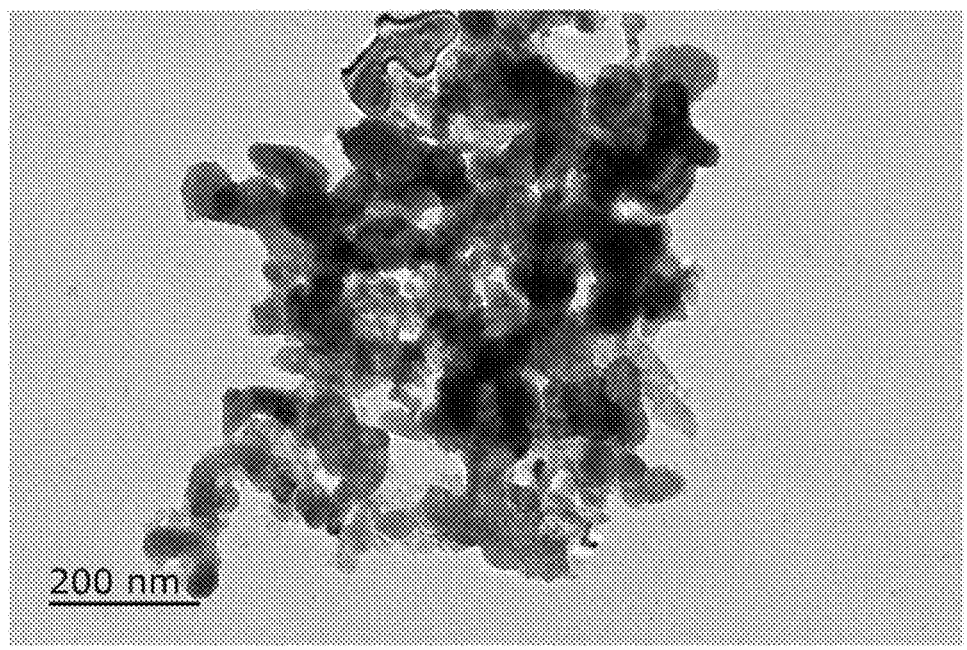
FIG. 15 is a TEM image of the nanomaterial NiCo$_2$O$_4$.

FIG. 15 is a TEM image of the NiCo$_2$O$_4$ nanomaterial serving as the raw material of this example. This TEM image shows a serious agglomeration state of the material.

Figure 1:
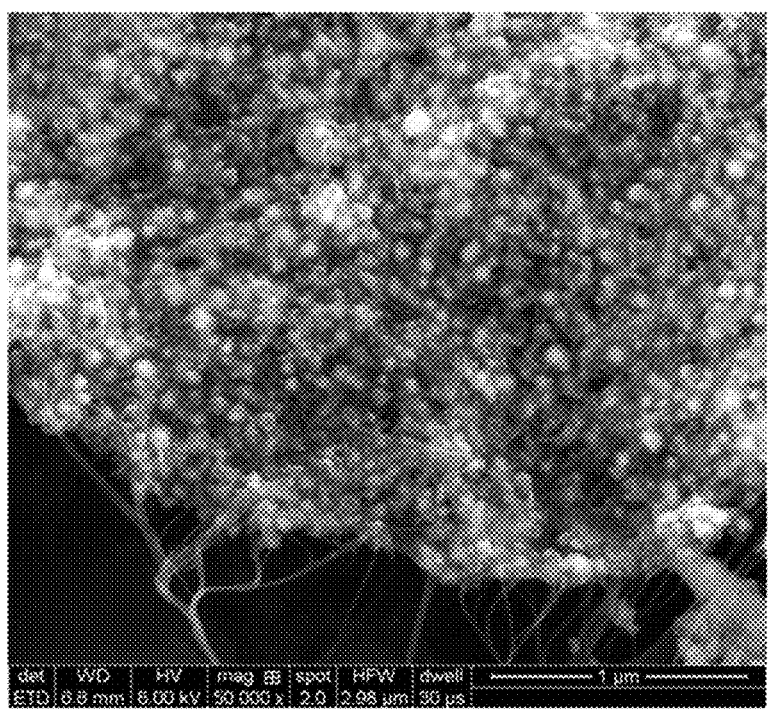
FIG. 1 is an SEM image of the S/NiCo$_2$O$_4$/C/CNT nanosheet composite prepared in Example 1 of the present invention.
Figure 2:
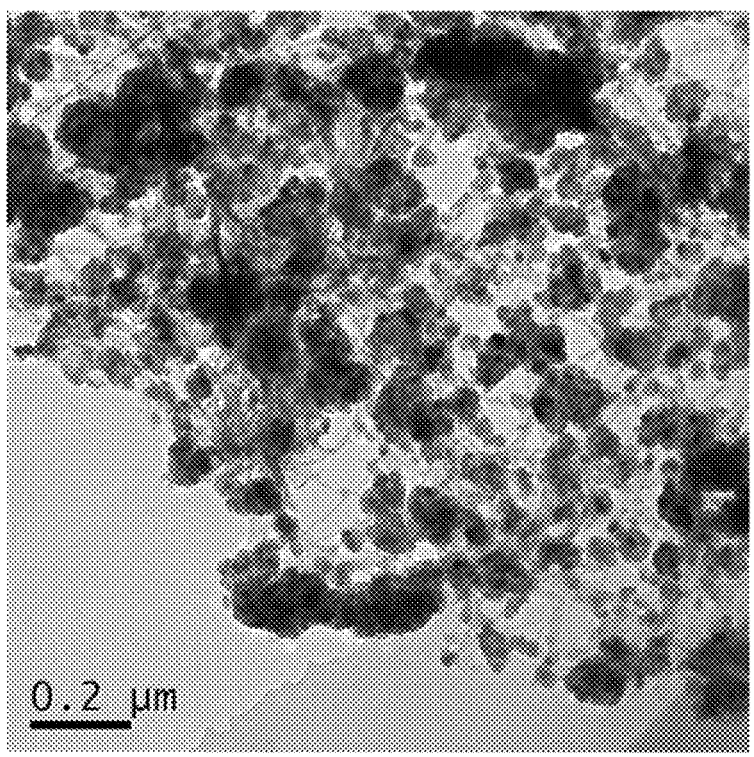
FIG. 2 is a TEM image of the S/NiCo$_2$O$_4$/C/CNT nanosheet composite prepared in Example 1 of the present invention.
Figure 3:
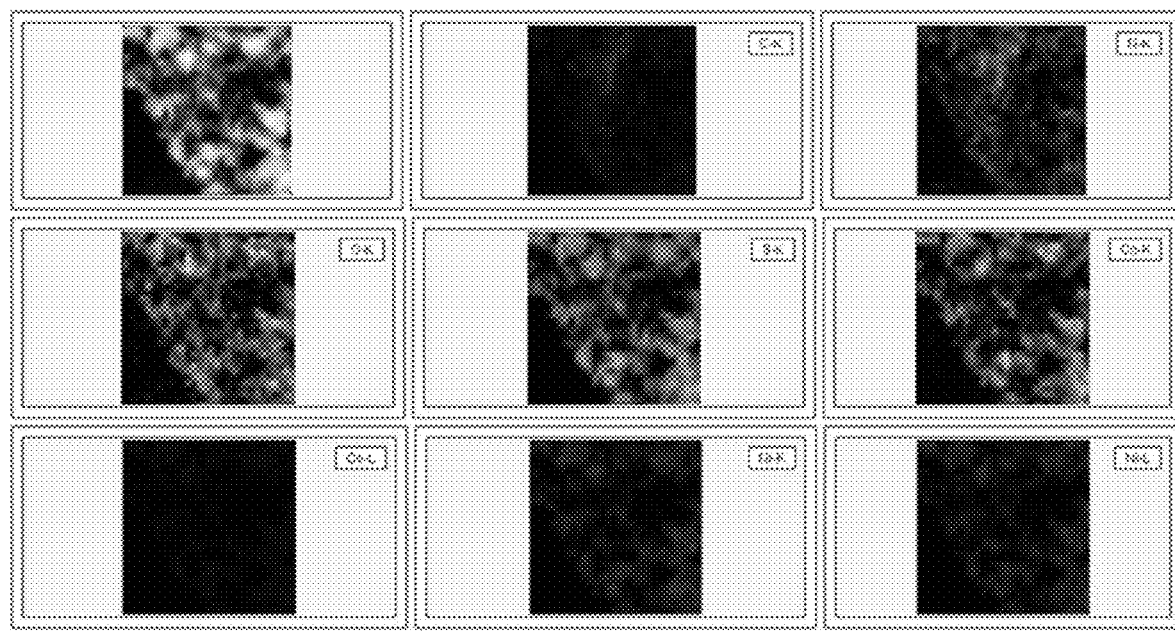
FIG. 3 is an elemental mapping of the S/NiCo$_2$O$_4$/C/CNT nanosheet composite prepared in Example 1 of the present invention.
Figure 4:
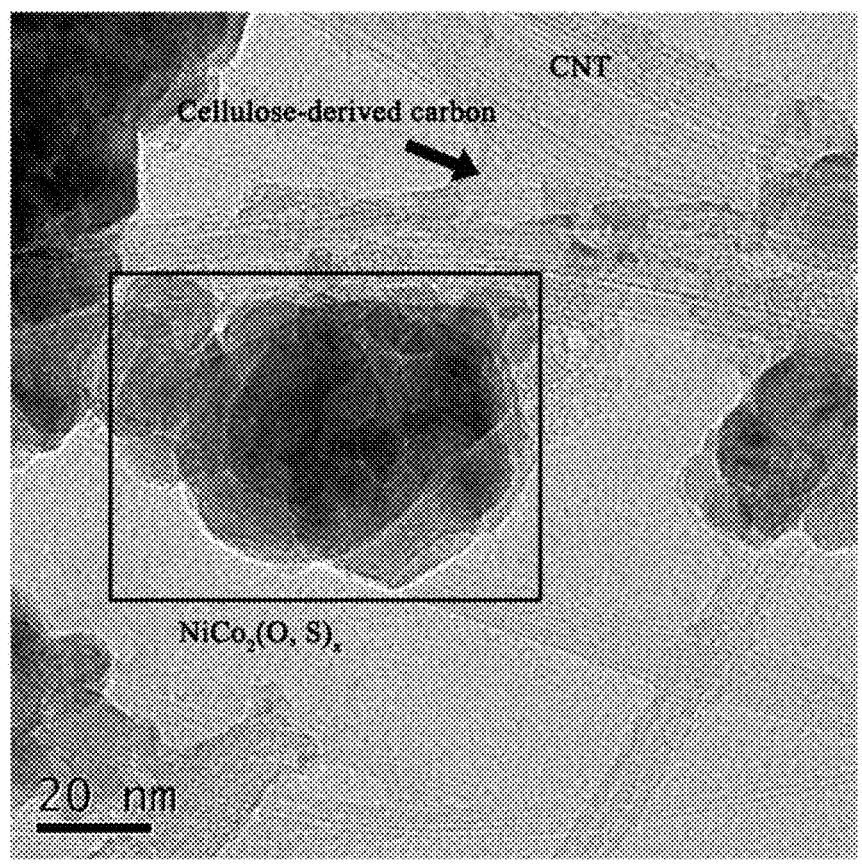
FIG. 4 is an enlarged TEM image of the S/NiCo$_2$O$_4$/C/CNT nanosheet composite prepared in Example 1 of the present invention.

FIG. 1 is an SEM image of the nanosheet composite prepared in Example 1 of the present invention; FIG. 2 is a TEM image of the nanosheet composite prepared in Example 1 of the present invention; FIG. 3 is an elemental mapping of the nanosheet composite prepared in Example 1 of the present invention; and FIG. 4 is an enlarged TEM image of the nanosheet composite prepared in Example 1 of the present invention.

FIGS. 1 and 2 show that the S/NiCo$_2$O$_4$/C/CNT composite nanomaterial prepared in this example exhibit a sheet-like structure, and sulfur, nickel, cobalt, oxygen, carbon and nitrogen elements are uniformly distributed on the nanosheet (FIG. 3). The resulting nanosheets are woven out of carbon nanotubes in a two-dimensional plane and are fixed by cellulose-derived carbon (FIG. 4). Such a structure in which the CNTs are cross-linked mutually and closely accumulated in a two-dimensional plane can serve as a high-speed passage for electrons, and effectively promote electron transfer. Moreover, a large amount of voids formed by cross-linking of CNTs in the nanosheets can effectively promote electrolyte transfer and improve the rate performance of the material. The $NiCo_2O_4$ nanoparticles are uniformly anchored onto the nanosheets, and have a good contact with the CNTs through the cellulose-derived carbon or contact with the CNTs directly. The elemental sulfur is tightly bounded to the nanosheets, and a large amount of it is attached to the polar $NiCo_2O_4$ nanoparticles, forming an effective composite structure. Among them, nitrogen-doped CNTs and polar $NiCo_2O_4$ have a very strong adsorption effect on polar lithium polysulfide, which can effectively prevent the shuttle effect of lithium polysulfide.

Figure 5:
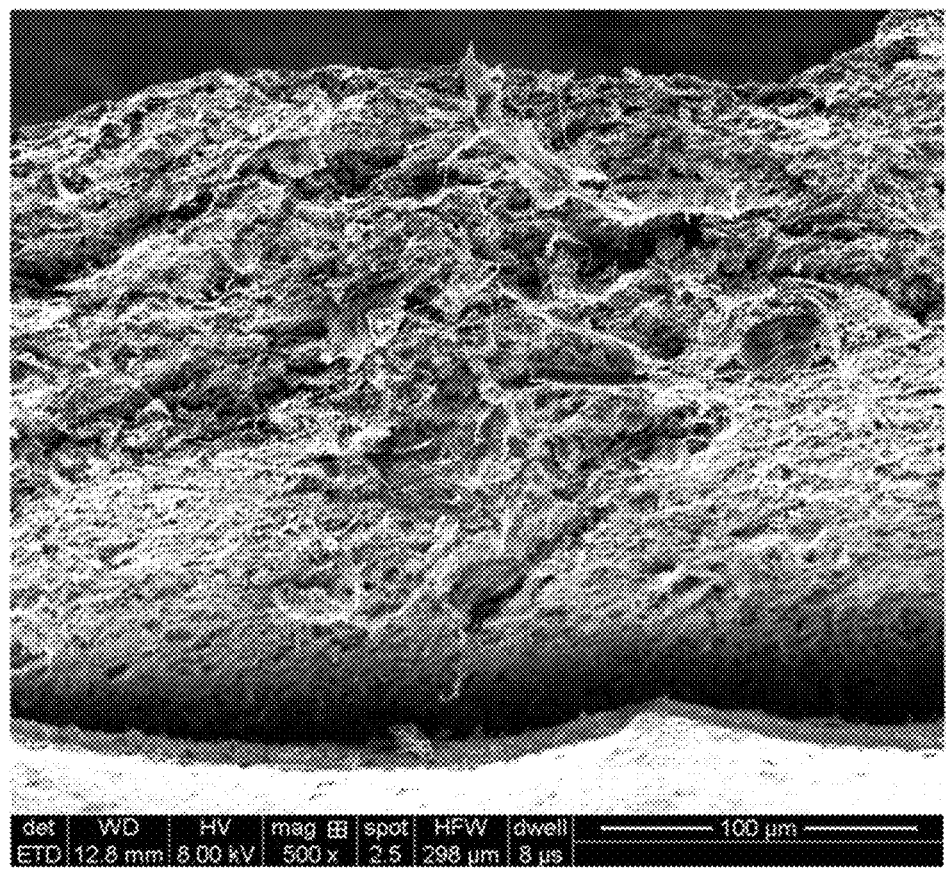
FIG. 5 is an SEM section image of an electrode prepared with the S/NiCo$_2$O$_4$/C/CNT nanosheet composite prepared in Example 1 of the present invention.

FIG. 5 is an SEM section image of an electrode prepared with the nanosheet composite prepared in Example 1 of the present invention. An ultra-thick electrode having a thickness of 119 micron prepared with the nanosheet composite still has a good electrochemical performance.

Figure 6:
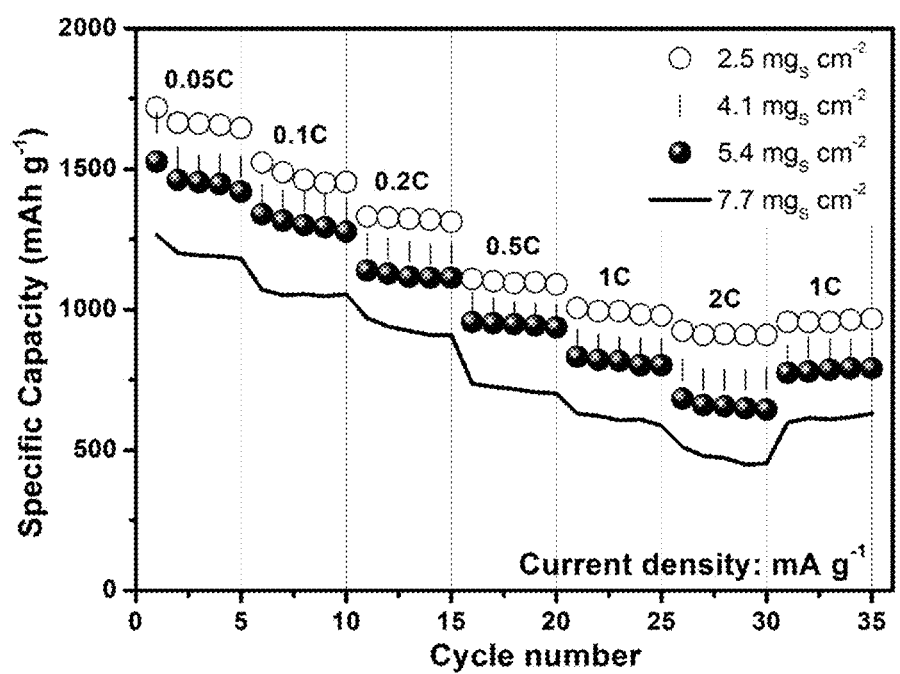
FIG. 6 is a rate performance image of an electrode prepared with the S/NiCo$_2$O$_4$/C/CNT nanosheet composite prepared in Example 1 of the present invention under different mass loading of sulfur.

FIG. 6 is a rate performance image of an electrode prepared with the $S/NiCo_2O_4/C/CNT$ nanosheet composite prepared in Example 1 of the present invention under different mass loading of sulfur. The image of FIG. 6 shows that the electrode under a mass loading of sulfur of 2.5 $mg \cdot cm^{-2}$ shows a capacity very close to the theoretical capacity of elemental sulfur (1675 mAh/g) at 0.05 C, and still shows a capacity of about 1000 mAh/g at a high rate of 2 C. The electrode still shows an excellent capacity and rate performance at a higher mass loading of sulfur of 7.7 $mg \cdot cm^{-2}$.

Figure 7:
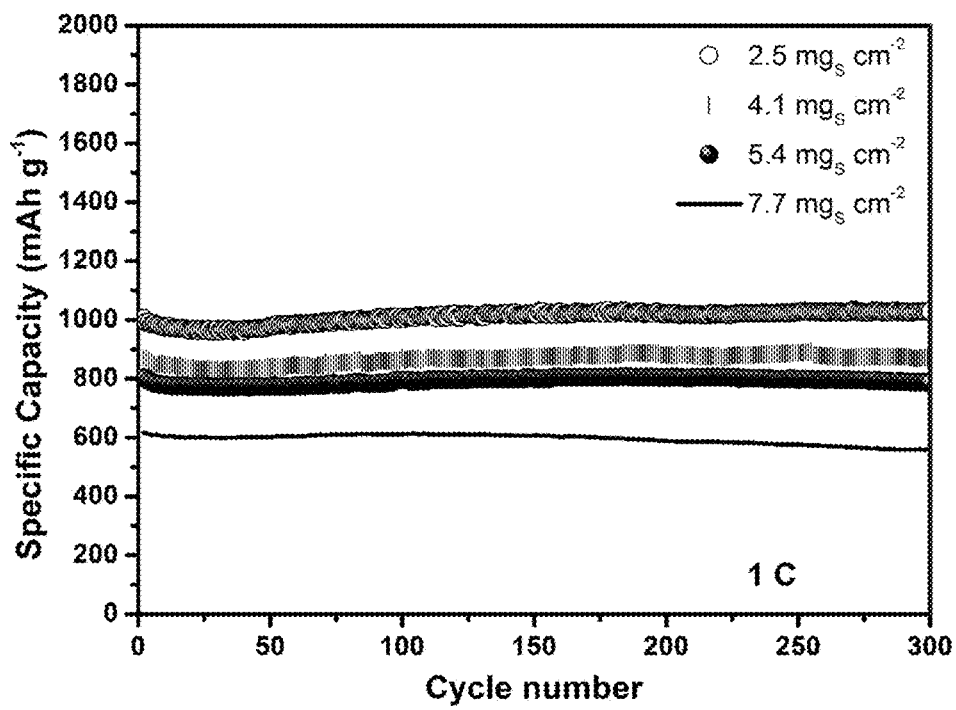
FIG. 7 is a cycle performance image of an electrode prepared with the S/NiCo$_2$O$_4$/C/CNT nanosheet composite prepared in Example 1 of the present invention under different mass loading of sulfur at a current density of 1 C.

FIG. 7 is a cycle performance image of an electrode prepared with the $S/NiCo_2O_4/C/CNT$ nanosheet composite prepared in Example 1 of the present invention under different mass loading of sulfur at a current density of 1 C. The image of FIG. 7 shows that the prepared electrode has an excellent cycling stability.

Figure 8:
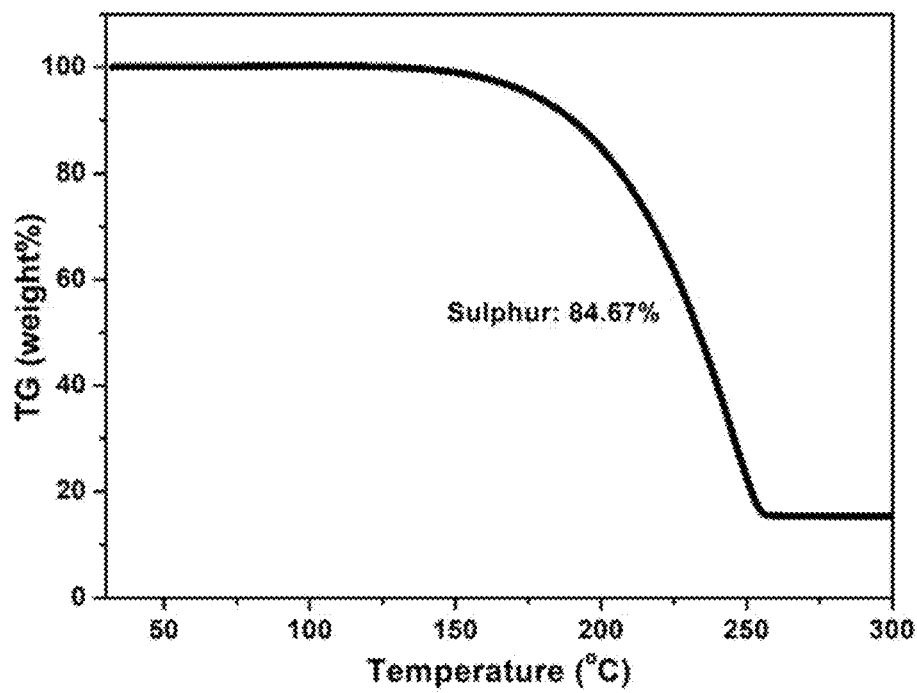
FIG. 8 is a thermogravimetric curve of the S/NiCo$_2$O$_4$/C/CNT nanosheet composite prepared in Example 1 of the present invention in air.

FIG. 8 is a thermogravimetric curve of the $S/NiCo_2O_4/C/CNT$ nanosheet composite prepared in Example 1 of the present invention in air. FIG. 8 shows that the material has a sulfur content of 84.67%.

Example 2

This Example is for illustrating the nanosheet composite ($S/TiO_2/C/CNT$) provided by the present invention and a preparation method thereof, and an electrode and a battery prepared with the material. The specific preparation steps are as follows:

(1) adding 0.2 g of $TiO_2$ into an ethylene glycol-water solution (1:1 in volume) containing 0.2 g of nanocellulose (having a nanocellulose concentration of 500 mg/l), performing sonication at a power of 600 W at a solution temperature of 5° C. for 8 minutes, then adding 0.04 g of CNTs, and continuing sonication at a power of 600 W for 8 minutes to obtain a dispersion liquid;

(2) placing the dispersion liquid obtained in step (1) in a deep-cooling refrigerator and freezing it at −50° C. for 12 hours, and then placing it in a freeze dryer and freeze-drying it at −30° C. for 48 hours to obtain a $TiO_2/NFC/CNT$ nanosheet composite;

(3) placing the nanosheet composite obtained in step (2) in a high-temperature furnace purged with argon gas, setting the temperature to 800° C., and heating for 180 minutes to obtain a $TiO_2/C/CNT$ nanosheet composite; and (4) mixing 0.2 g of the $TiO_2/C/CNT$ nanosheet composite obtained in step (3) with 2 g of sulfur and heating the mixture at 300° C. for 120 minutes to obtain the $S/TiO_2/C/CNT$ nanosheet composite having a very high mass loading of sulfur (86%).

Preparation of Electrode 80 parts by weight of the $S/TiO_2/C/CNT$ nanosheet composite having a high mass loading of sulfur prepared in step (4) was mixed with 10 parts by weight of polyvinylidene fluoride and 10 parts by weight of acetylene black to prepare an electrode slurry, and the electrode slurry was coated to prepare an electrode, with the mass of sulfur per unit area being 2.4 $mg \cdot cm^{-2}$, 4.0 $mg \cdot cm^{-2}$, 5.5 $mg \cdot cm^{-2}$ and 7.6 $mg \cdot cm^{-2}$ respectively.

Preparation of Battery

The electrode sheet prepared in this example was assembled into a CR2032 button battery in the same manner as in Example 1.

Characterization and Analysis

Figure 9:
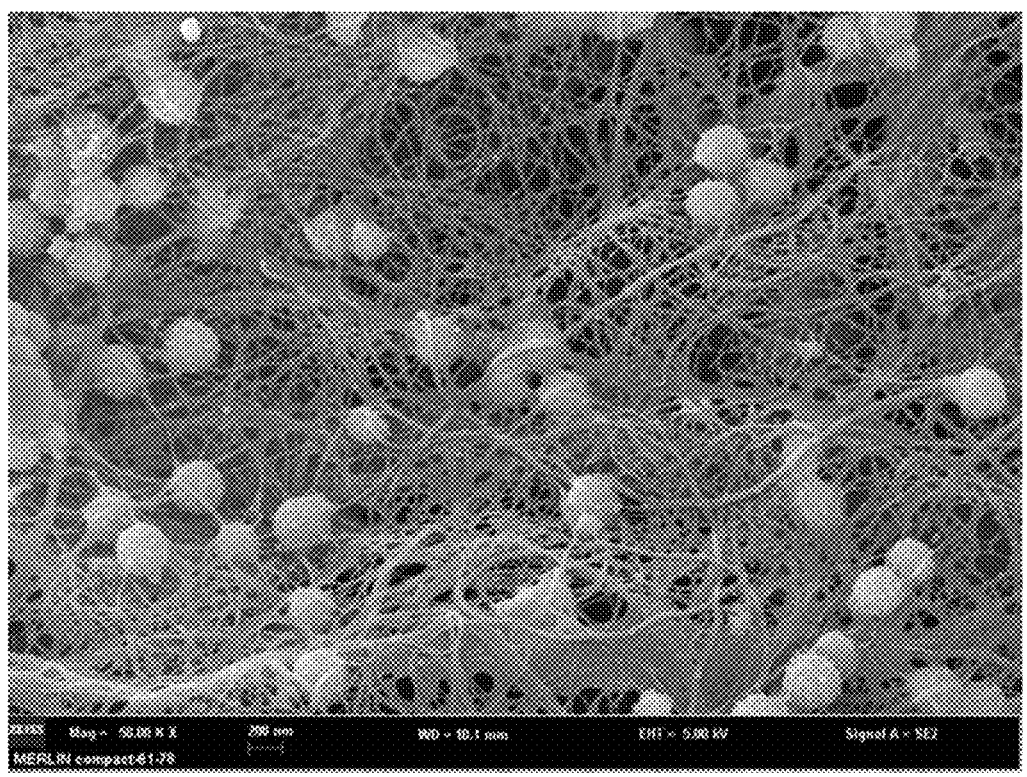
FIG. 9 is an SEM image of the S/TiO$_2$/C/CNT nanosheet composite prepared in Example 2 of the present invention.

FIG. 9 is an SEM image of the $S/TiO_2/C/CNT$ nanosheet composite prepared in Example 2 of the present invention showing a sheet-like structure, and shows that the $TiO_2$ spheres are uniformly embedded on the C/CNT nanosheets and have a good contact with CNT, which can effectively enhance the conductivity. The resulting nanosheets are woven out of carbon nanotubes in a two-dimensional plane and are fixed by cellulose-derived carbon. Such structure in which the CNTs are cross-linked mutually and closely accumulated in a two-dimensional plane can serve as a high-speed passage for electrons, and effectively promote electron transfer. Moreover, a large amount of voids formed by cross-linking of CNTs in the nanosheets can effectively promote electrolyte transfer and improve the rate performance of the material. The $TiO_2$ hollow nanospheres are uniformly anchored onto the nanosheets, and have a good contact with the CNTs through the cellulose-derived carbon or directly. The elemental sulfur is tightly bound to the nanosheets, and a large amount of it is attached to the polar $TiO_2$ spheres, forming an effective composite structure. Among them, nitrogen-doped CNTs and polar $TiO_2$ have a very strong adsorption effect on polar lithium polysulfide, which can effectively prevent the shuttle effect of lithium polysulfide. The dense ternary composite nanosheets can spontaneously assemble into an electrode on a copper foil during the coating process. Moreover, the nanosheet stacked dense structure forms a layer-upon-layer protection, and also inhibits the loss of lithium polysulfide. Such a structural property similar to that of the previous material proves that such C/CNT nanosheet is an excellent nanomaterial support.

Figure 10:
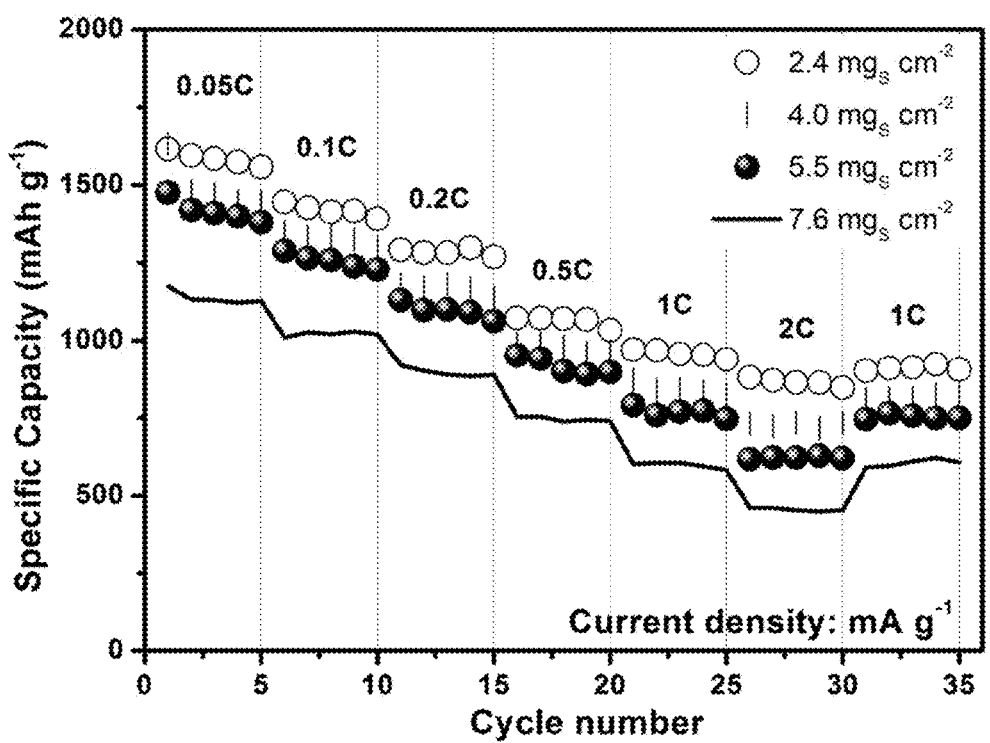
FIG. 10 is a rate performance image of an electrode prepared with the S/TiO$_2$/C/CNT nanosheet composite prepared in Example 2 of the present invention under different mass loading of sulfur.
Figure 11:
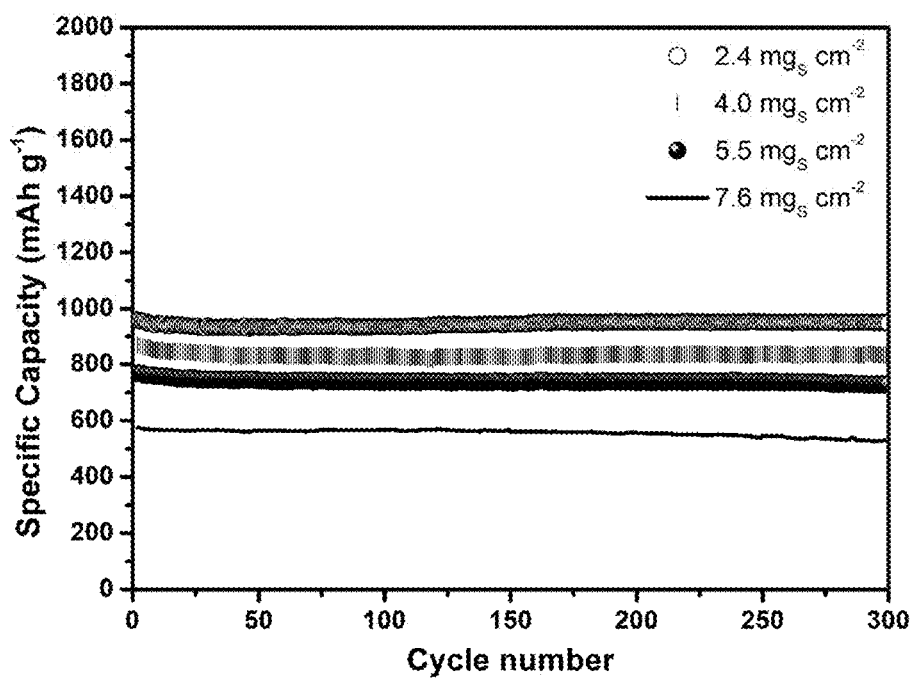
FIG. 11 is a cycle performance image of an electrode prepared with the S/TiO$_2$/C/CNT nanosheet composite prepared in Example 2 of the present invention under different mass loading of sulfur at a current density of 1 C.

FIG. 10 is a rate performance image of an electrode prepared with the $S/TiO_2/C/CNT$ nanosheet composite prepared in Example 2 of the present invention under different mass loading of sulfur. The image shows that the electrode under the mass loading of 2.4 $mg \cdot cm^{-2}$ shows a capacity of 1585 mAh/g at 0.05 C and still shows a capacity of about 895 mAh/g at a high rate of 2 C. The electrode still shows an excellent capacity and rate performance at a higher mass loading of sulfur (7.6 $mg \cdot cm^{-2}$). FIG. 11 is a cycle performance image of an electrode prepared with the $S/TiO_2/C/CNT$ nanosheet composite prepared in Example 2 of the present invention under different mass loading of sulfur at a current density of 1 C. This image shows that the prepared electrode has an excellent cycling stability.

Comparative Example 1

This comparative example prepares a nanosheet composite containing no transition metal compound (S/C/CNT) for comparison with the materials prepared in Examples 1 and 2 of the present invention. The specific preparation steps are as follows:

(1) adding 0.02 g of CNTs into aqueous cellulose solution containing 0.1 g of nanocellulose, and performing sonication at a power of 800 W at a solution temperature of 0° C. for 5 minutes to obtain a dispersion liquid;

(2) placing the dispersion liquid obtained in step (1) in a deep-cooling refrigerator and freezing it at −39° C. for 12 hours, and then placing it in a freeze dryer and freeze-drying it at −40° C. for 48 hours to obtain a NFC/CNT nanosheet composite;

(3) placing the nanosheet composite obtained in step (2) in a high temperature furnace purged with nitrogen gas, setting the temperature to 1000° C. and heating for 120 minutes to obtain a C/CNT nanosheet composite; and (4) mixing 0.1 g of the C/CNT nanosheet composite prepared in step (3) with 1 g of sulfur, and heating at 155° C. for 360 minutes to obtain the S/C/CNT nanosheet composite having a very high mass loading of sulfur (82%).

Preparation of Electrode 70 parts by weight of the S/C/CNT nanosheet composite having a high mass loading of sulfur prepared in step (4) was mixed with 10 parts by weight of polyvinylidene fluoride and 20 parts by weight of acetylene black to prepare an electrode slurry, and the electrode slurry was coated to prepare an electrode, with the mass of sulfur per unit area being 2.5 mg·cm$^{-2}$.

Preparation of Battery

The electrode sheet prepared in this comparative example was assembled into a CR2032 button battery in the same manner as in Example 1.

Characterization and Analysis

Figure 12:
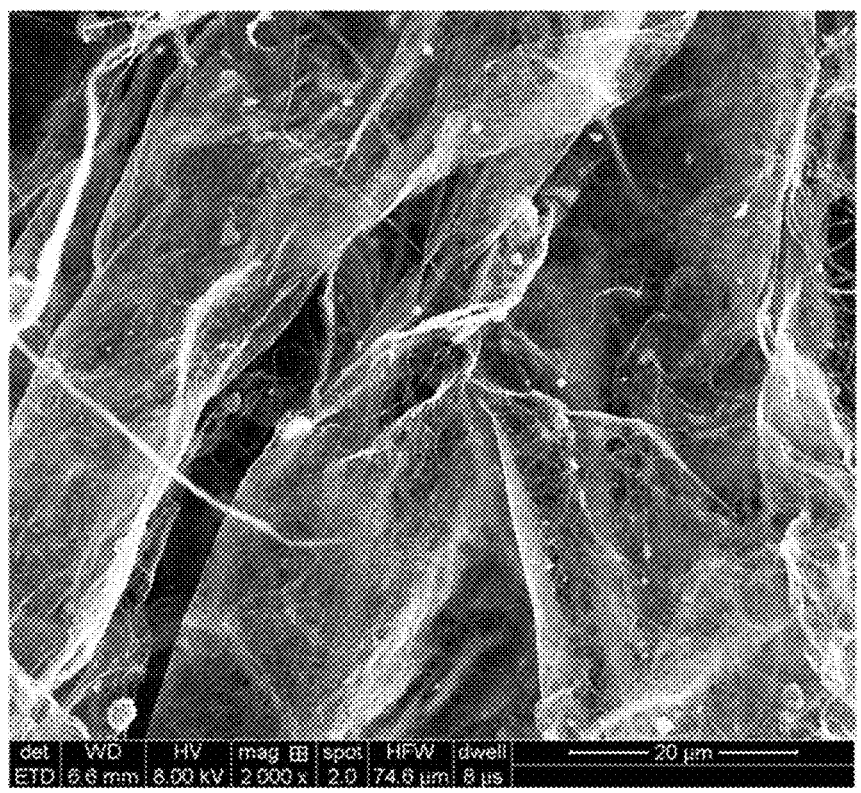
FIG. 12 is an SEM image of the C/CNT nanosheet composite before compounding with sulfur, which is prepared in step (3) of Comparative Example 1.

FIG. 12 is an SEM image of the C/CNT nanosheet composite before compounding with sulfur prepared in step (3) of Comparative Example 1. The SEM image shows that the composite has a nanosheet structure, in which CNTs are woven and fixed in the nanosheets.

Figure 13:
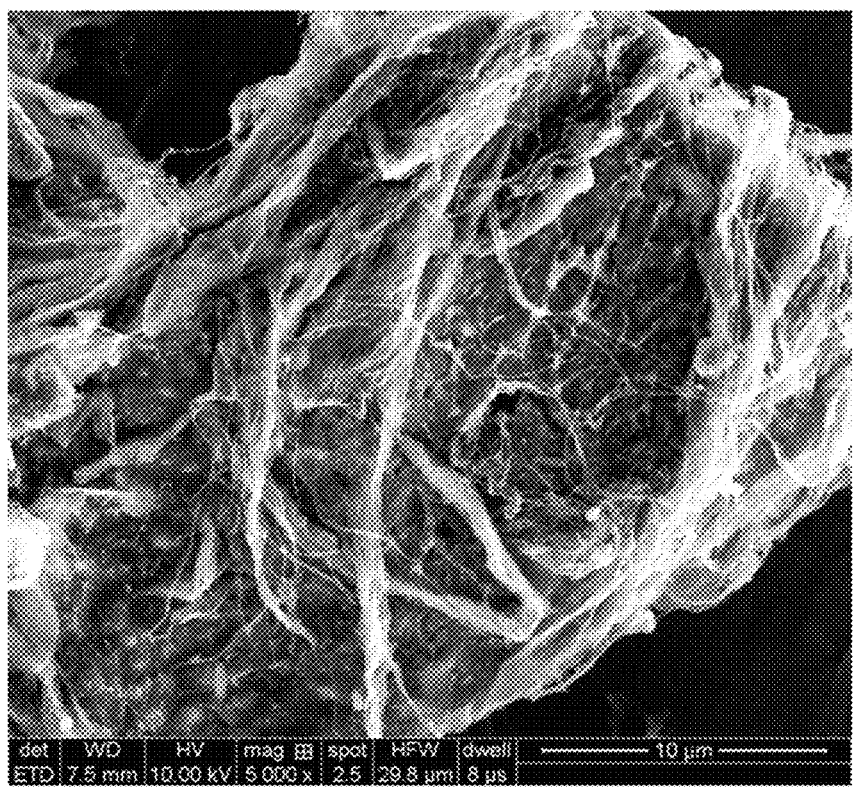
FIG. 13 is an SEM image of the S/C/CNT nanosheet composite prepared in Comparative Example 1.

FIG. 13 is an SEM image of the S/C/CNT nanosheet composite prepared in Comparative Example 1. The SEM image shows that the composite has a nanosheet stacked structure, in which elemental sulfur is fixed on the nanosheet.

Comparative Example 2

This comparative example prepares an S/CNT composite containing no transition metal compound nor carbon for comparison with the materials prepared in Examples 1 and 2 of the present invention. The specific preparation steps are as follows: mixing 0.1 g of CNTs with 1 g of sulfur and heating at 155° C. for 360 minutes to obtain the S/CNT composite having a high mass loading of sulfur (92%).

Preparation of Electrode 70 parts by weight of the S/CNT composite having a high mass loading of sulfur prepared in the comparative example was mixed with 10 parts by weight of polyvi=ylidene fluoride and 20 parts by weight of acetylene black to prepare an electrode slurry, and the electrode slurry was coated to prepare an electrode, with the mass of sulfur per unit area being 2.5 mg·cm$^{-2}$.

Preparation of Battery

The electrode sheet prepared in this comparative example was assembled into a CR2032 button battery in the same manner as in Example 1.

Characterization and Analysis

Figure 14:
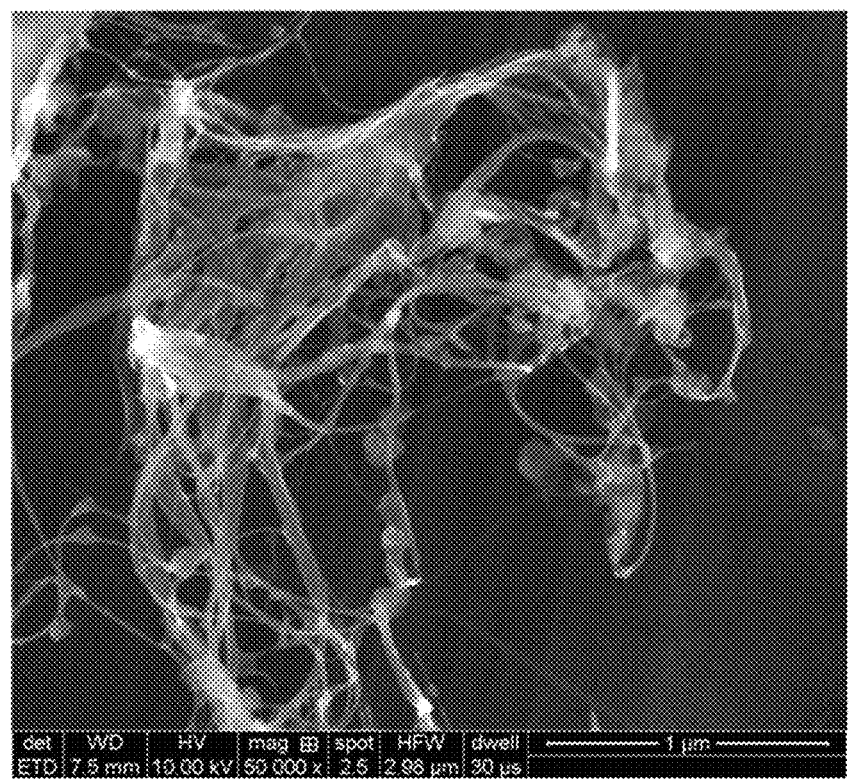
FIG. 14 is an SEM image of the S/CNT composite prepared in Comparative Example 2.

FIG. 14 is an SEM image of the S/CNT composite prepared in Comparative Example 2, and the SEM image shows that the composite has a chaotic structure.

The properties of the materials of the examples and comparative examples were measured and compared below.

The conductivity of CNTs, C/CNT nanosheet composite, NiCo$_2$O$_4$/C/CNT nanosheet composite and TiO$_2$/C/CNT nanosheet composite was measured by a 4-probe conductivity meter, and the results are shown in Table 1.

TABLE 1

| Materials | Conductivity S/cm |
| --- | --- |
| CNTs | 371 |
| C/CNT nanosheet composite | 1720 |
| NiCo$_2$O$_4$/C/CNT nanosheet composite | 54 |
| TiO$_2$/C/CNT nanosheet composite | 62 |

Table 2 lists the performance comparisons of the batteries prepared in the examples and comparative examples.

TABLE 2

| Battery | Mass of sulfur per unit area (mg · cm$^{-2}$) | average discharge capacitance of 5 tests at 0.05 C (mAhg$^{-1}$) | Capacity retention rate after 300 cycles (%) |
| --- | --- | --- | --- |
| Example 1 | 2.5 | 1632 | 98.2 |
|  | 4.1 | 1583 | 97.1 |
|  | 5.4 | 1491 | 95.7 |
|  | 7.7 | 1191 | 92.5 |
| Example 2 | 2.4 | 1610 | 98.4 |
|  | 4.0 | 1561 | 97.6 |
|  | 5.5 | 1425 | 95.9 |
|  | 7.6 | 1134 | 93.4 |
| Comparative Example 1 | 2.5 | 1245 | 84.6 |
| Comparative Example 2 | 2.5 | 914 | 43.2 |

The batteries prepared in Example 1 and Comparative Example 1 were subjected to charge-discharge tests at room temperature, and the limiting voltage was 1.7 V to 2.7 V, and the charge-discharge current densities were both 0.05 C.

The batteries prepared in Example 1 and Comparative Example 1 were subjected to cyclic charge-discharge tests at room temperature, the limiting voltage was 1.7 V to 2.7 V, the charge-discharge current density was 1 C, and the cycle period was 300 cycles. The results are shown in the battery performance comparison table of Table 3.

TABLE 3

| Battery | Mass of sulfur per unit area (mg · cm$^{-2}$) | average discharge capacitance of 5 tests at 0.05 C (mAhg$^{-1}$) | Capacity retention rate after 300 cycles (%) |
| --- | --- | --- | --- |
| Example 1 | ~2.5 | 1632 | 98.2 |
|  | ~4.0 | 1583 | 97.1 |
|  | ~5.5 | 1491 | 95.7 |
|  | ~7.5 | 1191 | 92.5 |
| Example 2 | ~2.5 | 1610 | 98.4 |
|  | ~4.0 | 1561 | 97.6 |
|  | ~5.5 | 1425 | 95.9 |
|  | ~7.5 | 1134 | 93.4 |
| Comparative Example 1 | ~2.5 | 1245 | 84.6 |
| Comparative Example 2 | ~2.5 | 914 | 43.2 |

Comparative Example 3

(1) Performing sonication towards to an aqueous solution of nanocellulose containing 0.1 g of nanocellulose (a nanocellulose concentration of 100 mg/l) at a power of 400 W at a solution temperature of 0° C. for 10 minutes; and (2) placing the solution obtained in step (1) in a deep-cooling refrigerator and freezing it at −39° C. for 12 hours, and then placing it in a freeze dryer and freeze-drying it at −40° C. for 48 hours to obtain the cellulose having a 2D-nanonetwork structure.

Figure 16:
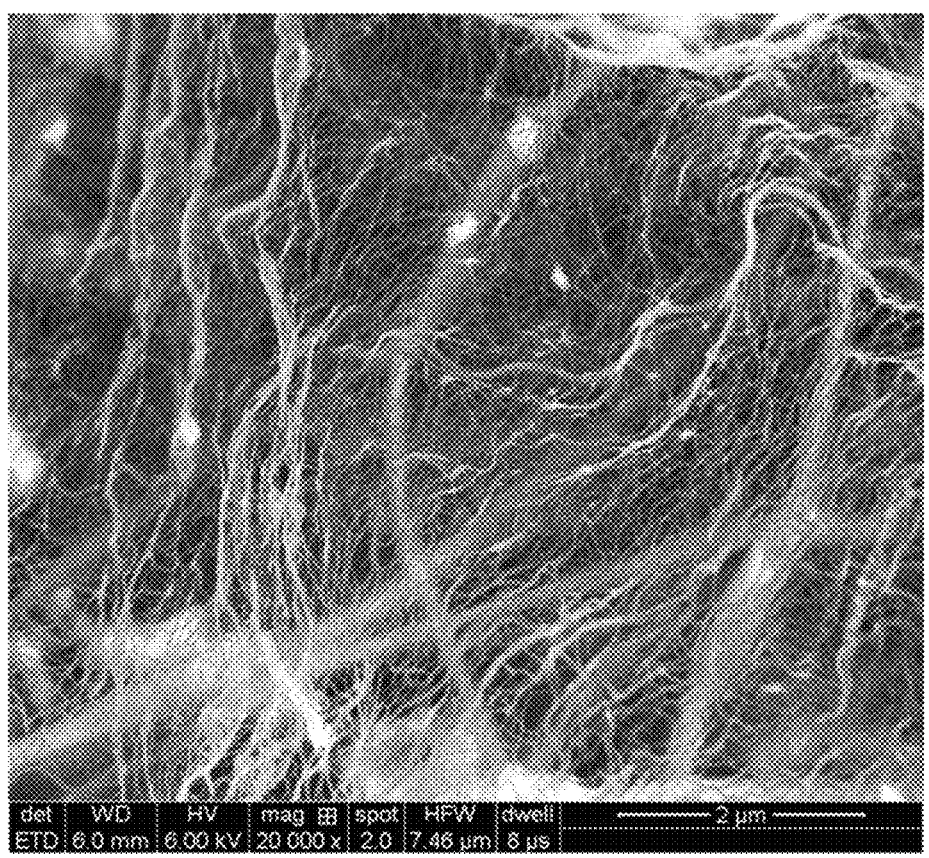
FIG. 16 is an SEM image of a 2D-nanonetwork structural cellulose prepared in Comparative Example 3.

FIG. 16 is an SEM image of the 2D-nanonetwork structural cellulose prepared in Comparative Example 3.

Comparative Example 4

(1) Adding 0.1 g of $NiCo_2O_4$ nanomaterial into water, performing sonication at a power of 400 W at a solution temperature of 0° C. for 5 minutes, then adding 0.02 g of CNTs (nitric acid-pretreated CNT, the same below), and continuing sonication at a power of 400 W for 5 minutes to obtain a dispersion liquid; and (2) placing the dispersion liquid obtained in step (1) in a deep-cooling refrigerator and freezing it at −39° C. for 12 hours, and then placing in a freeze dryer and freeze-drying it at −40° C. for 48 hours to obtain a $NiCo_2O_4$/CNT composite.

Figure 17:
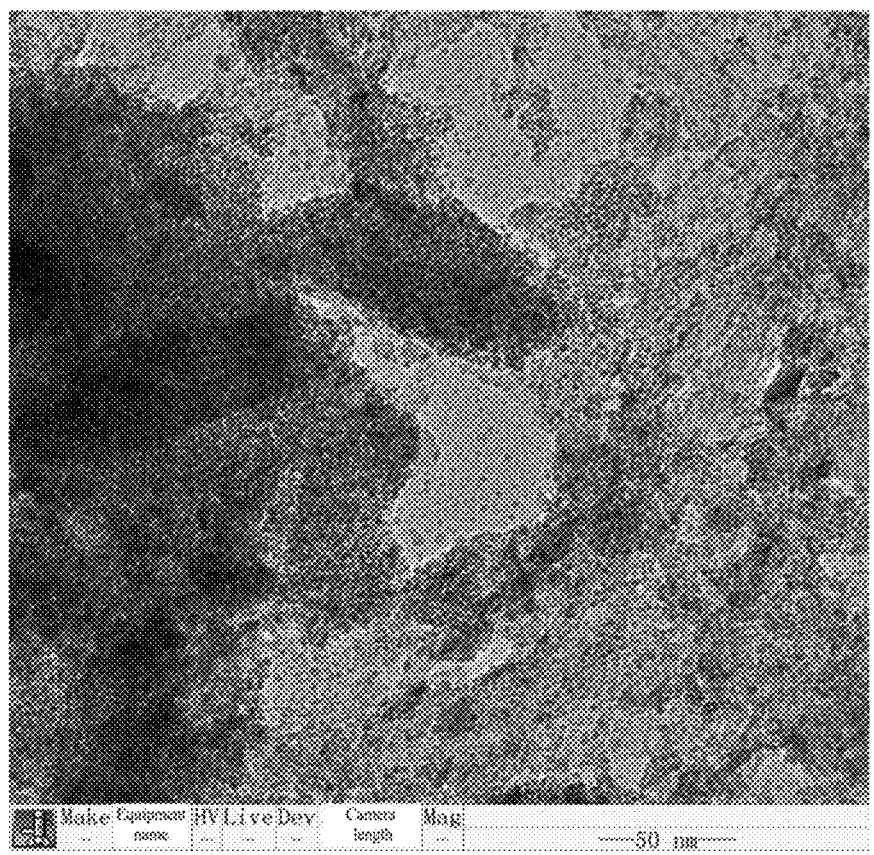
FIG. 17 is a TEM image of the NiCo$_2$O$_4$/CNT nano composite prepared in Comparative Example 4.

FIG. 17 is a TEM image of $NiCo_2O_4$/CNT nanocomposite prepared in Comparative Example 4. This TEM image shows a serious agglomeration.

Comparative Example 5

(1) Adding 0.1 g of $NiCo_2O_4$ nanomaterial into a nanocellulose aqueous solution containing 0.1 g of nanocellulose (a nanocellulose concentration of 100 mg/l), and performing sonication at a power of 400 W at a solution temperature of 0° C. for 10 minutes to obtain a dispersion liquid; and (2) placing the dispersion liquid obtained in step (1) in a deep-cooling refrigerator and freezing it at −39° C. for 12 hours, and then placing it in a freeze dryer and freeze-drying it at −40° C. for 48 hours to obtain a NFC/$NiCo_2O_4$ composite.

Figure 18:
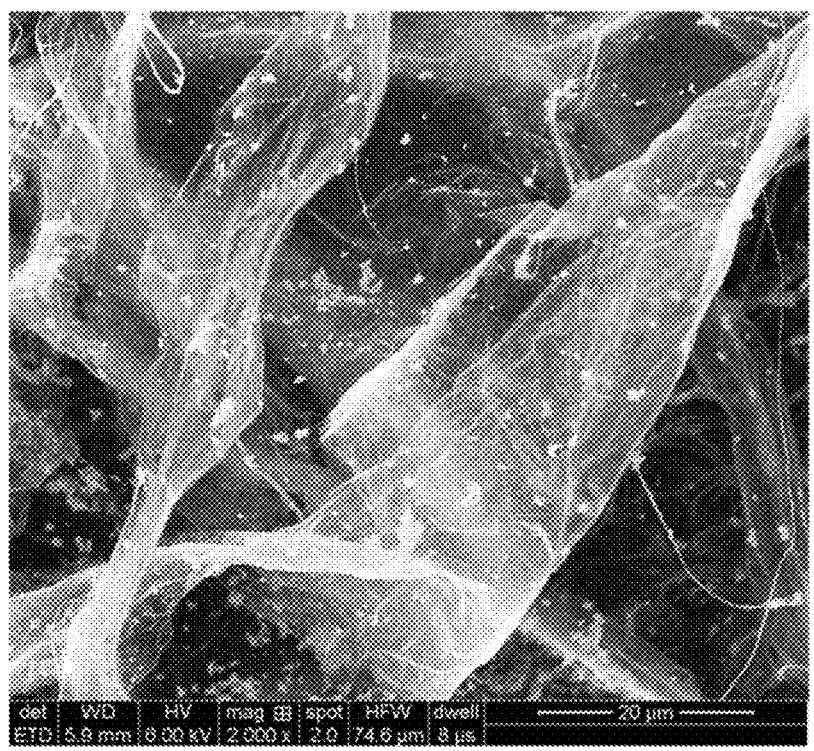
FIG. 18 is an SEM image of the NFC/NiCo$_2$O$_4$ composite prepared in Comparative Example 5.

FIG. 18 is an SEM image of the NFC/$NiCo_2O_4$ composite prepared in Comparative Example 5. The image shows that the $NiCo_2O_4$ nanomaterial has a good dispersibility on cellulose.

Figure 19:
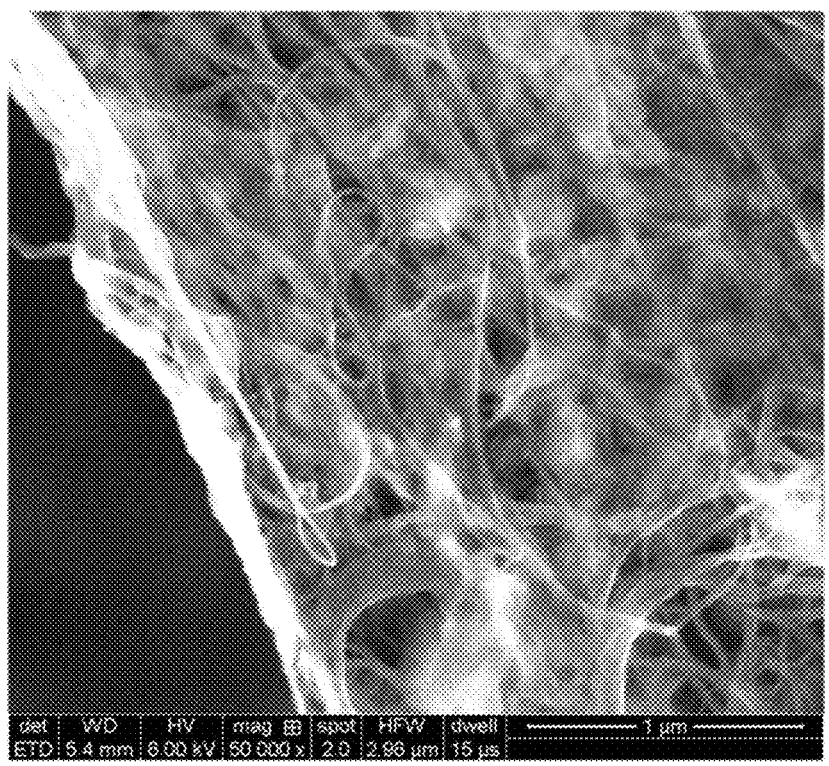
FIG. 19 is an SEM image of the NiCo$_2$O$_4$/NFC/CNT composite before compounding with sulfur, which is prepared in step (3) of Example 1.
Figure 20:
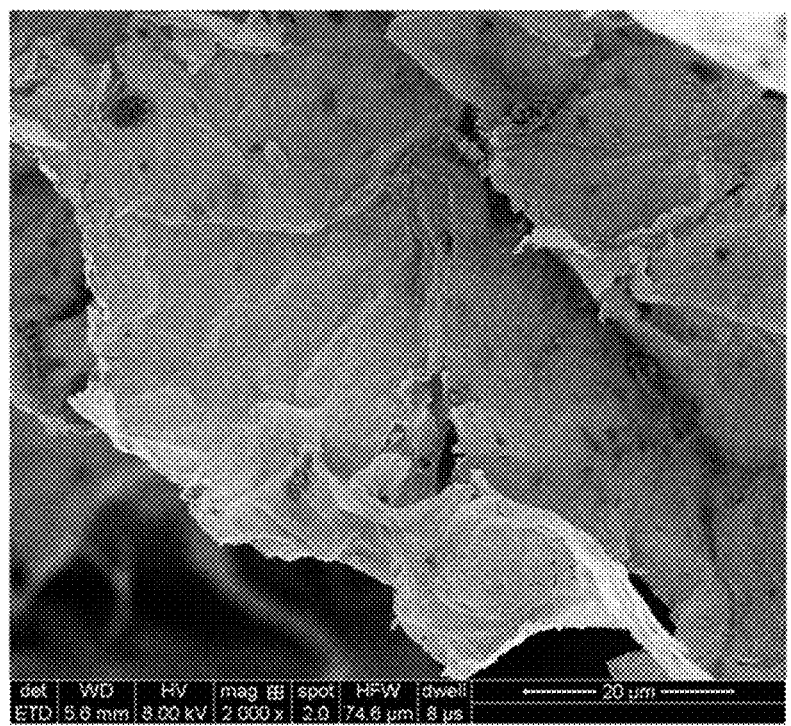
FIG. 20 is an SEM image of the NiCo$_2$O$_4$/C/CNT composite before compounding with sulfur, which is prepared in step (3) of Example 1.
Figure 21:
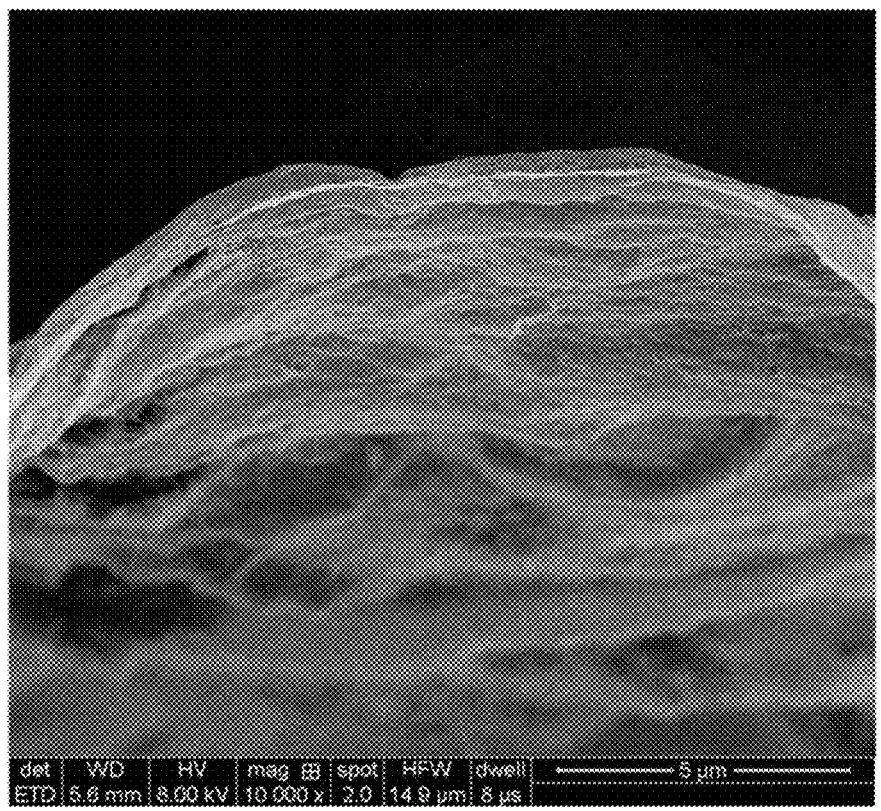
FIG. 21 is an SEM image of cross section of the NiCo$_2$O$_4$/C/CNT composite before compounding with sulfur, which is prepared in step (3) of Example 1.

As a control, FIG. 19 is an SEM image of the $NiCo_2O_4$/NFC/CNT nanosheet composite before compounding with the sulfur prepared in step (2) of Example 1; FIG. 20 is an SEM image of the $NiCo_2O_4$/C/CNT composite before compounding with sulfur prepared in step (3) of Example 1; FIG. 21 is an SEM image of cross section of the $NiCo_2O_4$/C/CNT composite before compounding with sulfur prepared in step (3) of Example 1, and the image shows that the thickness of the nanosheet is 50 nanometers.

Example 3

This example is for illustrating the nanosheet composite (S/FeP/C/CNT) provided by the present invention and a preparation method thereof, and an electrode and a battery prepared with the material. The specific preparation steps are as follows:

(1) adding 0.2 g of $Fe_2O_3$ into a nanocellulose glycol-water (1:1 in volume) solution containing 0.2 g of nanocellulose (a nanocellulose concentration of 2000 mg/l), performing sonication at a power of 600 W at a solution temperature of 5° C. for 8 minutes, then adding 0.04 g of CNTs, and continuing sonication at a power of 600 W for 8 minutes to obtain a dispersion liquid;

(2) placing the dispersion liquid obtained in step (1) in liquid nitrogen and freezing it for 12 hours, and then placing it in a freeze dryer and freeze-drying it at −40° C. for 48 hours to obtain a $Fe_2O_3$/NFC/CNT nanosheet composite;

(3) placing the nanosheet composite obtained in step (2) and 5 g of sodium hypophosphite in a high-temperature furnace purged with argon gas, setting the temperature to 800° C., and heating for 180 minutes to obtain a FeP/C/CNT nanosheet composite; and (4) mixing 0.2 g of the FeP/C/CNT nanosheet composite obtained in step (3) with 2 g of sulfur and heating the mixture at 300° C. for 120 minutes to obtain the S/FeP/C/CNT nanosheet composite having a very high mass loading of sulfur (80%).

Preparation of Electrode 80 parts by weight of the S/FeP/C/CNT nanosheet composite having a high mass loading of sulfur prepared in the example was mixed with 10 parts by weight of polyvinylidene fluoride and 10 parts by weight of acetylene black to prepare an electrode slurry, and the electrode slurry was coated to prepare an electrode, with the mass of sulfur per unit area being about 2.5 mg·cm$^{-2}$, 4.0 mg·cm$^{-2}$, 5.5 mg·cm$^{-2}$ and 7.5 mg·cm$^{-2}$ respectively.

Preparation of Battery

The electrode sheet prepared in this example was assembled into a CR2032 button battery in the same manner as in Example 1.

Characterization and Analysis

Figure 22:
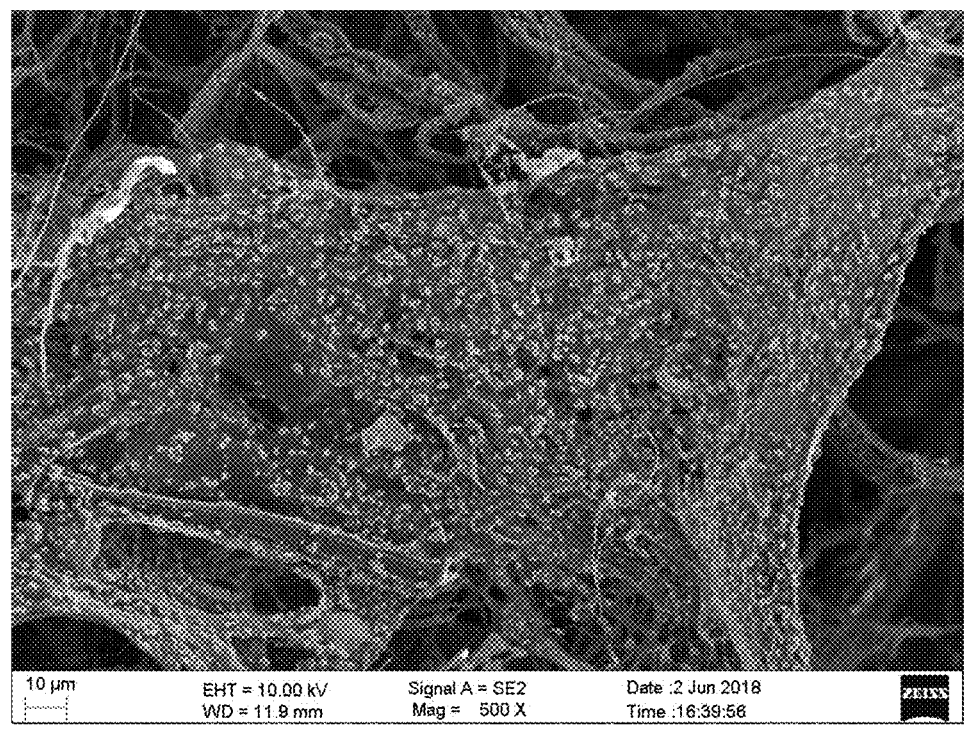
FIG. 22 is an SEM image of the S/FeP/C/CNT nanosheet composite prepared in Example 3 of the present invention.

FIG. 22 is an SEM image of the S/FeP/C/CNT nanosheet composite obtained in Example 3 of the present invention, the material shows a sheet-like structure, and CNTs are woven and fixed in the nanosheets. The resulting nanosheets are woven out of carbon nanotubes in a two-dimensional plane and are fixed by cellulose-derived carbon. Such a structure in which the CNTs are cross-linked mutually and closely accumulated in a two-dimensional plane can serve as a high-speed passage for electrons, and effectively promote electron transfer. Moreover, a large amount of voids formed by cross-linking of CNTs in the nanosheets can effectively promote electrolyte transfer and improve the rate performance of the material. The particles are uniformly anchored onto the nanosheets, and have a good contact with the CNTs through the cellulose-derived carbon or directly. The elemental sulfur is tightly bound to the nanosheets, and a large amount of it is attached to the polar FeP, forming an effective composite structure. Among them, nitrogen-doped CNTs and polar FeP have a very strong adsorption effect on polar lithium polysulfide, which can effectively prevent the shuttle effect of lithium polysulfide. The dense ternary composite nanosheets can spontaneously assemble into an electrode on a copper foil during the coating process. Moreover, the nanosheet stacked dense structure forms a layer-upon-layer protection, and also inhibits the loss of lithium polysulfide. Such a structural property similar to that of the previous material proves that such C/CNT nanosheet is an excellent nanomaterial support.

Figure 23:
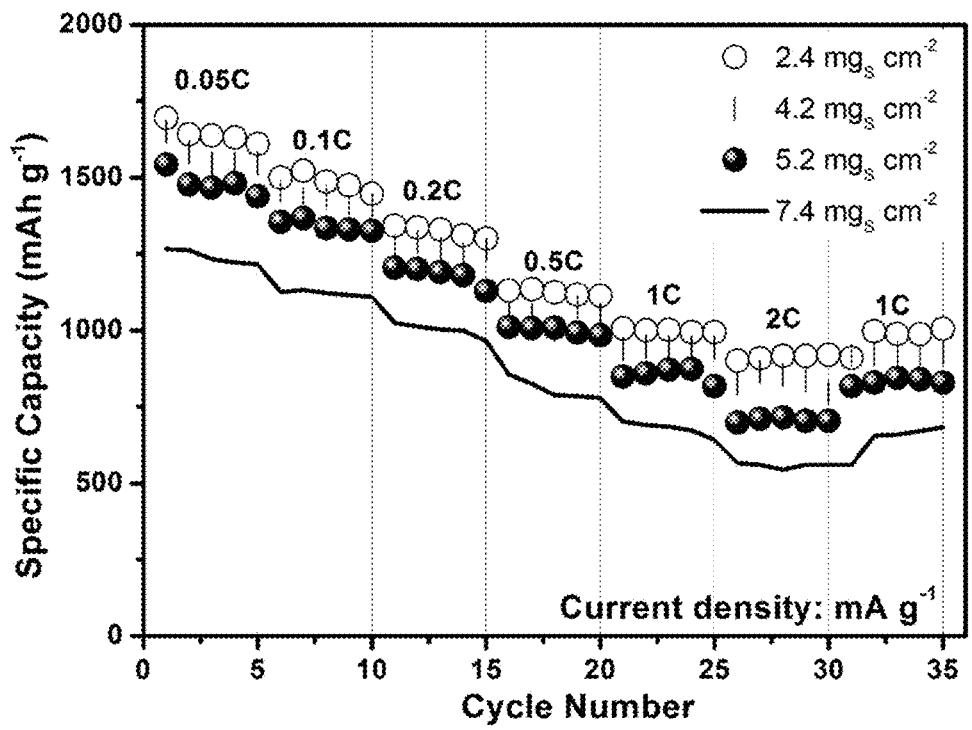
FIG. 23 is a rate performance image of an electrode prepared with the S/FeP/C/CNT nanosheet composite prepared in Example 3 of the present invention under different mass loading of sulfur.
Figure 24:
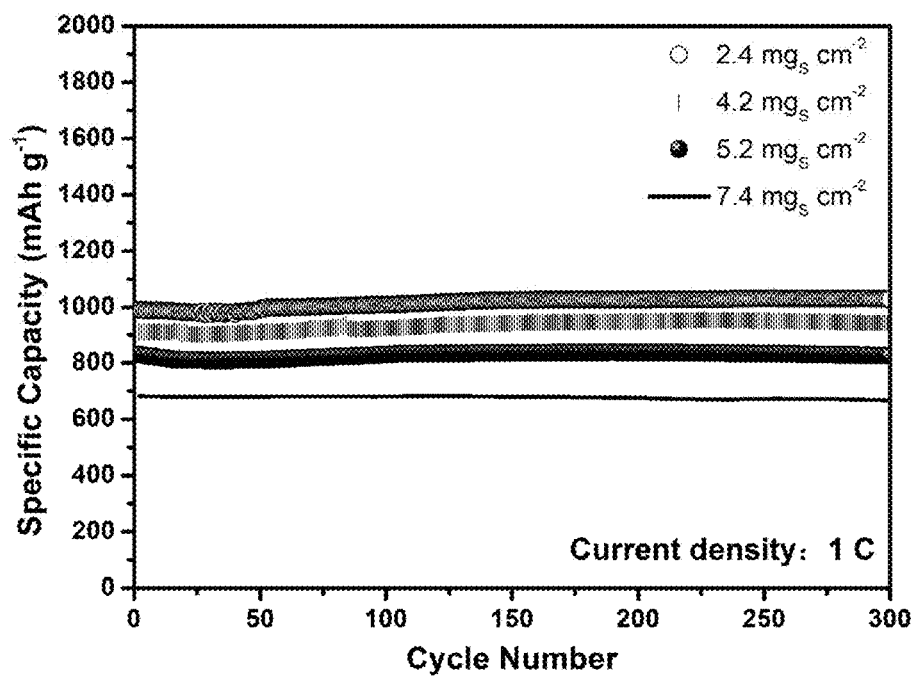
FIG. 24 is a cycle performance image of an electrode prepared with the S/FeP/C/CNT nanosheet composite prepared in Example 3 of the present invention under different mass loading of sulfur at a current density of 1 C.

FIG. 23 is a rate performance image of an electrode prepared with the S/FeP/C/CNT nanosheet composite prepared in Example 3 of the present invention under different mass loading of sulfur. The image shows that the electrode under the mass loading of 2.5 mg·cm$^{-2}$ shows a capacity of 1637 mAh/g at 0.05 C and still has a capacity of about 916 mAh/g at a high rate of 2 C. The electrode still shows an excellent capacity and rate performance at a higher mass loading of sulfur (7.7 mg·cm$^{-2}$). FIG. 24 is a cycle performance image of an electrode prepared with the S/FeP/C/CNT nanosheet composite prepared in Example 3 of the present invention under different mass loading of sulfur at a current density of 1 C. This image shows that the electrode has an excellent cycling stability.

Example 4

This example is for illustrating the nanosheet composite (S/FeS/C/CNT) provided by the present invention and a preparation method thereof, and an electrode and a battery prepared with the material. The specific preparation steps are as follows:

(1) adding 0.2 g of $Fe_2O_3$ into a nanocellulose glycol-water (1:1 in volume) solution containing 0.2 g of nanocellulose (a nanocellulose concentration of 4000 mg/l), performing sonication at a power of 600 W at a solution temperature of 5° C. for 8 minutes, then adding 0.04 g of CNTs, and continuing sonication at a power of 600 W for 8 minutes to obtain a dispersion liquid;

(2) placing the dispersion liquid obtained in step (1) in liquid nitrogen and freezing it for 12 hours, and then placing it in a freeze dryer and freeze-drying it at −40° C. for 48 hours to obtain a $Fe_2O_3$/NFC/CNT nanosheet composite;

(3) placing the nanosheet composite obtained in step (2) and 5 g of elemental sulfur in a high-temperature furnace purged with argon gas, setting the temperature to 800° C., and heating for 180 minutes to obtain a FeS/C/CNT nanosheet composite; and (4) mixing 0.2 g of the FeS/C/CNT nanosheet composite obtained in step (3) with 2 g of sulfur and heating the mixture at 300° C. for 120 minutes to obtain the S/FeS/C/CNT nanosheet composite having a very high mass loading of sulfur (82%).

Preparation of Electrode 80 parts by weight of the S/FeS/C/CNT nanosheet composite having a high mass loading of sulfur prepared in the example was mixed with 10 parts by weight of polyvinylidene fluoride and 10 parts by weight of acetylene black to prepare an electrode slurry, and the electrode slurry was coated to prepare an electrode, with the mass of sulfur per unit area being about 2.5 $mg \cdot cm^{-2}$, 4.0 $mg \cdot cm^{-2}$, 5.5 $mg \cdot cm^{-2}$ and 7.5 $mg \cdot cm^{-2}$ respectively.

Preparation of Battery

The electrode sheet prepared in this example was assembled into a CR2032 button battery in the same manner as in Example 1.

Characterization and Analysis

Figure 25:
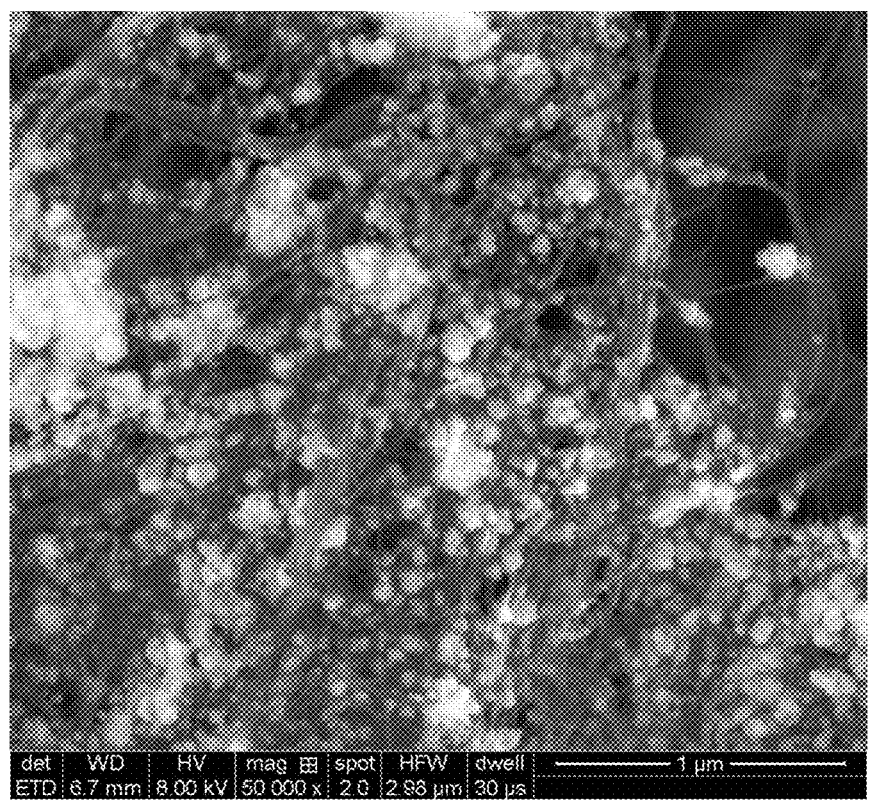
FIG. 25 is an SEM image of the S/FeS/C/CNT nanosheet composite prepared in Example 4 of the present invention.

FIG. 25 is an SEM image of the S/FeS/C/CNT nanosheet composite prepared in Example 4 of the present invention, the material shows a sheet-like structure, and CNTs are woven and fixed in the nanosheets. The resulting nanosheets are woven out of carbon nanotubes in a two-dimensional plane and are fixed by cellulose-derived carbon. Such a structure in which the CNTs are cross-linked mutually and closely accumulated in a two-dimensional plane can serve as a high-speed passage for electrons, and effectively promote electron transfer. Moreover, a large amount of voids formed by cross-linking of CNTs in the nanosheets can effectively promote electrolyte transfer and improve the rate performance of the material. The particles are uniformly anchored onto the nanosheets, and have a good contact with the CNTs through the cellulose-derived carbon or contact with the CNTs directly. The elemental sulfur is tightly bound to the nanosheets, and a large amount of it is attached to the polar FeS, forming an effective composite structure. Among them, nitrogen-doped CNTs and polar FeS have a very strong adsorption effect on polar lithium polysulfide, which can effectively prevent the shuttle effect of lithium polysulfide.

The dense ternary composite nanosheets can spontaneously assemble into an electrode on a copper foil during the coating process. Moreover, the nanosheet stacked dense structure forms a layer-upon-layer protection, and also inhibits the loss of lithium polysulfide. Such a structural property similar to that of the previous material proves that such C/CNT nanosheet is an excellent nanomaterial support.

Figure 26:
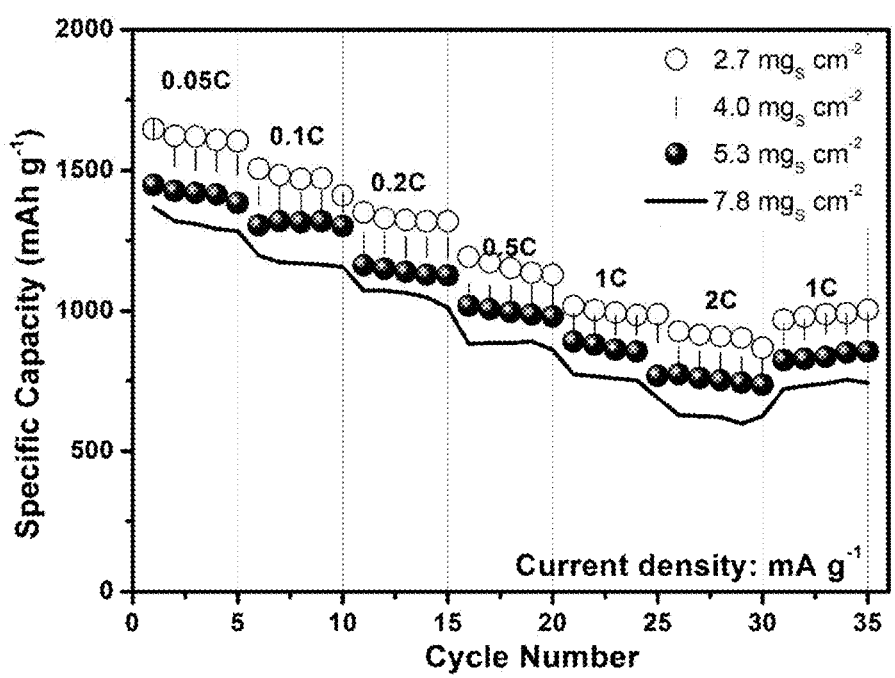
FIG. 26 is a rate performance image of an electrode prepared with the S/FeS/C/CNT nanosheet composite prepared in Example 4 of the present invention under different mass loading of sulfur.
Figure 27:
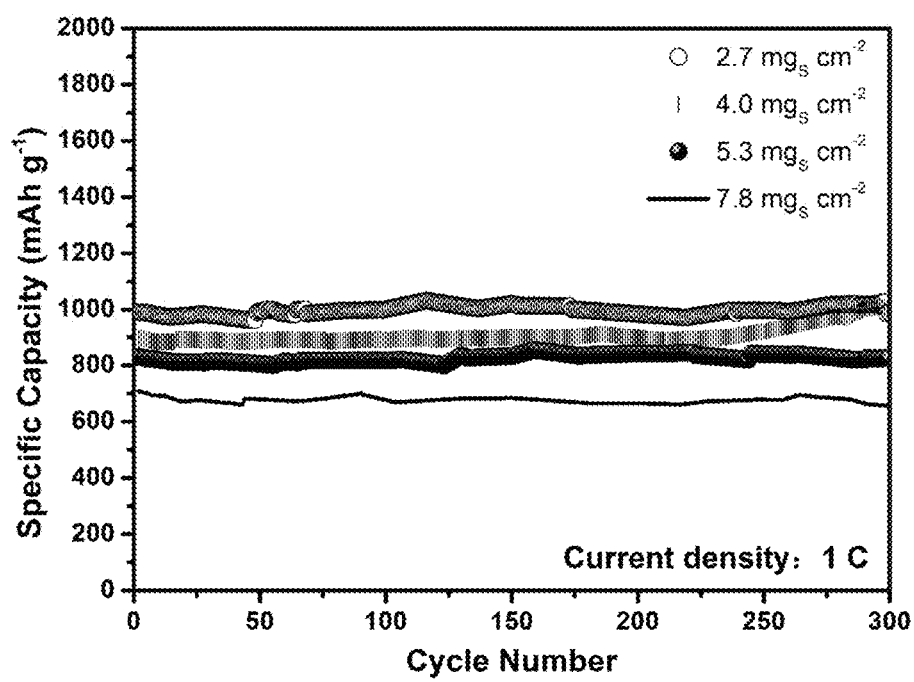
FIG. 27 is a cycle performance image of an electrode prepared with the S/FeS/C/CNT nanosheet composite prepared in Example 3 of the present invention under different mass loading of sulfur at a current density of 1 C.

FIG. 26 is a rate performance image of an electrode prepared with the S/FeS/C/CNT nanosheet composite prepared in Example 4 of the present invention under different mass loading of sulfur. The image shows that the electrode under the mass loading of 2.5 $mg \cdot cm^{-2}$ shows a capacity of 1619 mAh/g at 0.05 C and still shows a capacity of about 908 mAh/g at a high rate of 2 C. The electrode still has an excellent capacity and rate performance at a higher mass loading of sulfurs (7.7 $mg \cdot cm^{-2}$). FIG. 27 is a cycle performance image of an electrode prepared with the S/FeS/C/CNT nanosheet composite prepared in Example 4 of the present invention under different mass loading of sulfur at a current density of 1 C. The image shows that the electrode has an excellent cycling stability.

Finally, it should be noted that the above embodiments are merely illustrative of the technical solutions of the present invention, but not intended to be limiting; although the present invention has been described in detail with reference to the foregoing embodiments, those skilled in the art will understand that the technical solutions described in the foregoing embodiments may be modified, or some or all of the technical features therein may be equivalently substituted; and the modifications or substitutions do not deviate the nature of the corresponding technical solution from the scopes of the technical solutions of the embodiments of the present invention, and they all fall within the scope of the claims and the description of the present invention.

The invention claimed is:

1. A method for preparing a composite nanosheet of S/$NiCo_2O_4$/C/CNT for a cathode of a lithium-sulfur battery, comprising the steps of:
   (1) adding 0.1 g of $NiCo_2O_4$ nanomaterial into a nanocellulose solution containing 0.1 g of nanocellulose, performing sonication at a solution temperature of 0-15° C. for 3-15 minutes, then adding 0.02 g of CNTs, and continuing sonication for 5 minutes to obtain a dispersion liquid;
   (2) placing the dispersion liquid obtained in step (1) in a deep-cooling refrigerator and freezing it at −39° C. for 12 hours, and then placing it in a freeze dryer and freeze-drying it at −40° C. for 48 hours to obtain a $NiCo_2O_4$/NFC/CNT nanosheet composite;
   (3) placing the nanosheet composite obtained in step (2) in a high-temperature furnace purged with a protective gas, setting the temperature to 1000° C., and heating for 120 minutes to obtain a $NiCo_2O_4$/C/CNT nanosheet composite; and
   (4) mixing 0.1 g of the nanosheet composite obtained in step (3) with 1 g of sulfur and heating the mixture at 155° C. for 360 minutes to obtain the S/$NiCo_2O_4$/C/CNT nanosheet composite for the cathode of the lithium-sulfur battery, wherein:
   the nanocellulose is extracted from wood or bamboo; and
   the nanocellulose has a 2D-nanonetwork structure.

2. The method in claim 1, wherein the CNT is pretreated with nitric acid.

3. The method in claim 2, wherein the S/$NiCo_2O_4$/C/CNT nanosheet composite has a mass loading of sulfur of 85%.

4. The method in claim 3, wherein the concentration of nanocellulose in the nanocellulose solution is 100 mg/l.

5. The method in claim 4, wherein the solvent of the nanocellulose solution is.

6. The method in claim 5, wherein the sonication in step (1) is performed at a power of 400 W.

7. The method in claim 6, wherein step (2) is carried out by:
   placing the dispersion liquid in a freeze dryer for freeze drying under a pressure of less than 1 Pa.

8. The method in claim 7, wherein the protective gas in step (3) is nitrogen gas.

* * * * *